(12) United States Patent
Ihara

(10) Patent No.: US 7,075,994 B2
(45) Date of Patent: Jul. 11, 2006

(54) SIGNAL TRANSMISSION METHOD AND SIGNAL TRANSMISSION APPARATUS

(75) Inventor: Kiichi Ihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 927 days.

(21) Appl. No.: 09/844,112

(22) Filed: Apr. 27, 2001

(65) Prior Publication Data

US 2002/0006140 A1    Jan. 17, 2002

(30) Foreign Application Priority Data

Apr. 28, 2000   (JP)   ............................. 2000-130629

(51) Int. Cl.
*H04N 7/12*    (2006.01)
*H04B 1/66*    (2006.01)

(52) U.S. Cl. .............................................. 375/240.28
(58) Field of Classification Search ........... 375/240.28; 348/324.1, 321
See application file for complete search history.

(56) References Cited

U.S. PATENT DOCUMENTS

| | | | | |
|---|---|---|---|---|
| 6,047,027 A | * | 4/2000 | Miyagosi et al. | 375/240.28 |
| 6,195,393 B1 | * | 2/2001 | Nemiroff et al. | 375/240.28 |
| 6,611,624 B1 | * | 8/2003 | Zhang et al. | 382/232 |
| 6,678,332 B1 | * | 1/2004 | Gardere et al. | 375/240.26 |
| 6,741,290 B1 | * | 5/2004 | Wells | 348/512 |
| 6,792,047 B1 | * | 9/2004 | Bixby et al. | 375/240.26 |
| 6,806,909 B1 | * | 10/2004 | Radha et al. | 348/384.1 |

* cited by examiner

*Primary Examiner*—Nhon Diep
(74) *Attorney, Agent, or Firm*—Frommer Lawrence & Haug LLP; William S. Frommer; Thomas F. Presson

(57) ABSTRACT

An encoder generates a TS packet of PSI and PCR in synchronization with reference signals generated by an STC reference signal generator and by a picture sequence reference signal generator. A switching TS of multiplexed packet is produced by encoding and packetizing the signals of pictures and voices. When a TS switch performs stream switching, a controller controls the encoder so that any stream having information is not transmitted. Encoding information amount and transmission information amount of packets are controlled. The transmission timing of a PCR packet is also controlled. A plurality of encoders performs similar processes in synchronization. The TS switch switches switching TS's, forming a single output TS, without introducing transients and characteristic degradation.

28 Claims, 12 Drawing Sheets

250
SIGNAL TRANSMISSION METHOD AND SIGNAL TRANSMISSION APPARATUS

BACKGROUND OF THE INVENTION

1. Field of the Invention

The present invention relates to a signal transmission method and a signal transmission apparatus. More particularly, the present invention relates to a method and apparatus for signal transmission, in which a plurality of streams formed of packetized signals are selected, and then concatenated into a single output stream for transmission. When the streams are concatenated, System Time Clocks are synchronized across a plurality of stream output devices for outputting the stream, and the continuity of Program Clock References (PCR), Presentation Time Stamps (PTS), and Decoding Time Stamps (DTS) in the output stream is assured. The stream output device is controlled so that any stream having information is not transmitted at the switching of streams.

2. Description of the Related Art

In digital broadcasting, pictures and voices are transmitted using TS's (Transport Streams) complying with the MPEG (Moving Picture Experts Group) 2 Standard, which has been standardized as ISO (International Organization for Standardization)/IEC (International Electrotechnical Commission) 13818-1.

FIG. 12A shows stream (data chain) ES of compressed data of pictures and voices. The streams of compressed data are packetized and are the tagged with a PES (Packetized Elementary Stream) header. The PES stream shown in FIG. 12B is thus formed. The PES stream is then packetized and is then associated with a TS (Transport Stream) header containing a program time reference value PCR (Program Clock Reference) as shown in FIG. 12C. The TS packet, each as long as 188 bytes, is thus created. A single transport stream (TS) is constructed of a plurality of TS packets.

A signal transmission apparatus, which switches a plurality of TS's for transmission, has no proper point where two Transport Streams are concatenated without no transients introduced for the following reasons.

For example, in a video encoded in compliance with the MPEG 2 (ISO/IEC 13818-2), the amount of information such as GOP (Group of Pictures) unit varies depending on the difficulty of encoding, even though the average of encoding information amount is constant. A plurality of ES's of pictures and voices is packetized, forming PES streams. The PES stream is then split into TS packets, each having a predetermined data amount. The transmission information amount of video is fixed to an average value. For this reason, the transmission time of the TS per unit GOP is not constant. Variations occur in the relative delay time between data input to an encoder and an encoded TS picture information output from the encoder.

Two encoded picture signals, even if encoded from the same origin through the same encoding means having the same format, offer no guarantee that the start end positions of the GOP coincide with each other.

If TS switching is performed for switching between pictures in such a situation, a lap occurs between the GOPs at the switching time of TS's. The GOPs in the TS's thus suffer from information loss. If there occurs a gap between the streams at the switching time, another GOP is then partly included, permitting unwanted information to be added. A receiver apparatus receiving such a TS is unable to perform correct signal processing based on the TS, a transient possibly takes place in the video signal output obtained through signal processing.

As for voice, encoded voice, encoded in compliance with the MPEG 2, BC (Backward Compatible) (ISO/IEC13818-3) Standard, has a constant encoding information amount. Since a TS is formed by multiplexing the encoded voice with the multiplexed video, variations occur in the relative delay time between data input to an encoder and an encoded TS voice information output from the encoder. In the voice, encoded in compliance with the MPEG2 voice, AAC (Advance Audio Coding) (ISO/IEC13818-7) Standard, the average of the encoding information amount is constant, but the information amount per encoding unit varies depending on the difficulty of encoding. Therefore, variations occur in the relative delay time between data input to an encoder and an encoded TS voice information output from the encoder.

As is the case with the picture signal, in accordance with the two Standards, if a lap occurs between the voice encoding units between the TS's at the switching time, the TS's prior to and subsequent to the switching suffer from information loss in voice encoding units. If there occurs a gap between the streams at the switching time, another voice encoding unit is included, permitting unwanted information to be added. A receiver apparatus receiving such a TS is unable to perform correct signal processing based on the TS, a transient possibly takes place in the voice signal output obtained through signal processing.

Like the picture and voice data, coded data suffers variations in the relative delay time between TS data. If a lap occurs between the data of the TS's at the switching time, the TS subsequent to the switching suffers from partial information loss. If the TS suffers from a gap, part of another data is included, permitting unwanted information to be added. Unable to perform a correct processing, a receiver apparatus cannot present correct information or stops presenting information.

Information such as Program Specific Information (PSI) or Entitlement Control Message (ECM) may be transmitted together with pictures and voices in the TS. Japanese Post Office Regulations proposed the transmission period for transmitting these pieces of information in the DVB (Digital Video Broadcasting) recommendations. If multiplexing points fail to coincide with each other between switched TS's, the transmission period of the TS subsequent to switching is disturbed, and the recommended transmission period may not be observed. The display of the pictures and the timing of the audio output may be unstable. The transmission timing of data such as EPG (Electronic Program Guide) can also vary. If there occurs a lap between the TS's at switching, the TS's of the EPG partly suffer from information loss. If there occurs a gap between the TS's at switching, another EPG may be partly included, adding unwanted information. For this reason, no correct processing is performed. A receiver apparatus may not present correct information or may stop presenting the information.

Since the TS has typically a mix of a plurality of types of TS packets, switching all TS's is even more difficult.

To resolve these problems, encoded pictures and voices contained in the TS may be decoded, the decoded pictures and voices may be then concatenated using a known technique, and then may be re-encoded again. However, this method creates new problems such as an increase in the delay of data and degradation in the characteristics of data.

Since encoding and decoding through the MPEG2 Standard need certain processing time, a system performing decoding/re-encoding and a system performing no decoding/re-encoding make a substantial difference therebetween in delay time involved. For this reason, the adjustment of the delay time in an entire transmitter system needs to be performed with respect to the decoding/re-encoding system having the substantial delay time. If all other systems are adjusted with respect to the typically less frequently used decoding/re-encoding system, costs and space involved become substantially large. This delay problem becomes serious in two-way transmission applications.

Since in the MPEG2 Standard, pictures and voices are compressed in a lossy coding, a decoding technique cannot fully restore the data in the original decompressed state thereof. If a decoding/re-encoding operation is performed, the data is substantially degraded in image quality and audio quality. Since the method of decoding/re-encoding is not applicable to data other than picture and audio data, the pictures and voices are not correctly presented due to characteristics of the PSI and ECM.

SUMMARY OF THE INVENTION

Accordingly, it is an object of the present invention to provide a signal transmission method and a signal transmission apparatus for switching TS's without creating transients and characteristic degradation therein.

In one aspect, the present invention relates to a signal transmission method for selecting streams from a plurality of streams, each composed of a signal packetized in compliance with the Moving Picture Experts Group (MPEG) Standard, and concatenating the streams into one single output stream and outputting the output stream. The signal transmission method includes the steps of assuring synchronization in System Time Clocks (STC) across a plurality of stream output device for outputting streams, assuring continuities of Program Clock Reference (PCR), Presentation Time Stamp (PTS), and Decoding Time Stamp (DTS) of the output stream when the streams are concatenated, and controlling the stream output device so that any stream containing information is not transmitted at the switching of streams when the streams are concatenated.

In another aspect, the present invention relates to a signal transmission apparatus and includes a plurality of stream output devices which encodes and packetizes a signal in compliance the MPEG Standard, multiplexes packetized signals, and then outputs the multiplexed signal in a stream, a stream switching device which creates a single output stream by switching and concatenating streams output from the plurality of stream output devices, thereby forming and outputting a single output stream, a control device for controlling the operation of the plurality of stream output devices and the stream switching device, and a reference signal generator for generating a reference signal serving as a reference for the operation performed in the plurality of stream output devices and the stream switching device, wherein the control device controls the plurality of stream output devices, thereby synchronizing the System Time Clocks (STC) across the stream output devices, assures the continuity of a Progress Clock Reference (PCR), a Presentation Time Stamp (PTS), and a Decoding Time Stamp (DTS) while not transmitting a stream having information when the streams are concatenated.

In accordance with the present invention, when TS's is selected from among the plurality of TS's to form a single output TS, STCs are synchronized across the TS output devices. When two TS's are concatenated by switching the TS's, the continuity of the PCR, PTS, and DTS is assured. Any TS having information is not transmitted at the time of TS switching. The stream output device causes the Program Specific Information (PSI) and the Program Clock Reference to coincide with each other in timing and period and the transmission periods of the PSI and the PCR in the output stream are set to be a predetermined period.

When a TS is created by packetizing a picture element signal, the continuity of the picture sequence, the Presentation Time Stamp (PTS) and the Decoding Time stamp (DTS) in the output stream is assured in the output stream by synchronizing the Groups of Pictures (GOPS) prior to and subsequent to the stream switching. The stream containing information is not transmitted at the switching of streams by controlling the stream output device so that the finish end of the Group of Pictures (GOP) is transmitted prior to the switching of the streams while the start end of a next GOP is transmitted subsequent to the switching of the streams. The stream output device is controlled so that a first GOP subsequent to the stream switching becomes a closed GOP. The stream output device is controlled so that the start end of the first GOP subsequent to the stream switching becomes the start end of a Packetized Elementary Stream (PES) tagged with a PTS.

When a TS is created by packetizing a voice element signal, the continuity of the Presentation Time Stamp (PTS) in the output stream is assured by synchronizing the voice encoding units prior to and subsequent to the stream switching. The stream output device is controlled so that the start end of a first voice encoding unit subsequent to the stream switching becomes the start end of a PES tagged with a PTS.

When the stream is created by packetizing an encoding signal relating to one of a picture element signal and a voice element signal, the stream output device synchronize the data encoding units prior to and subsequent to the stream switching, thereby assuring the continuity of the PTS in the output stream. The stream output device is controlled so that the start end of a first data encoding unit becomes the start end of a PES packet tagged with a PTS.

When the TS is created by packetizing information signal relating to service information, the stream output device synchronizes control information containing a scramble key for streaming, and assures the continuity of the scramble key subsequent to the stream switching. The stream output device is controlled so that the scramble keys prior to and subsequent to the stream switching coincide with the scramble key of common information and so that the PSI coincides with the PCR in timing and period.

When the stream is created by packetizing a signal having a Transmission and Multiplexing Configuration Control (TMCC) frame structure, the stream output device is controlled so that the transmission of the finish end of the TMCC frame is completed prior to the stream switching while the start end of a next TMCC frame is transmitted subsequent to the stream switching. When a discontinuity occurs in a continuity indicator in the output stream, the value of the continuity indicator subsequent to a discontinuity point is updated to be a value continued from the value immediately prior to the discontinuity point.

DESCRIPTION OF THE PREFERRED EMBODIMENTS

Figure 1:
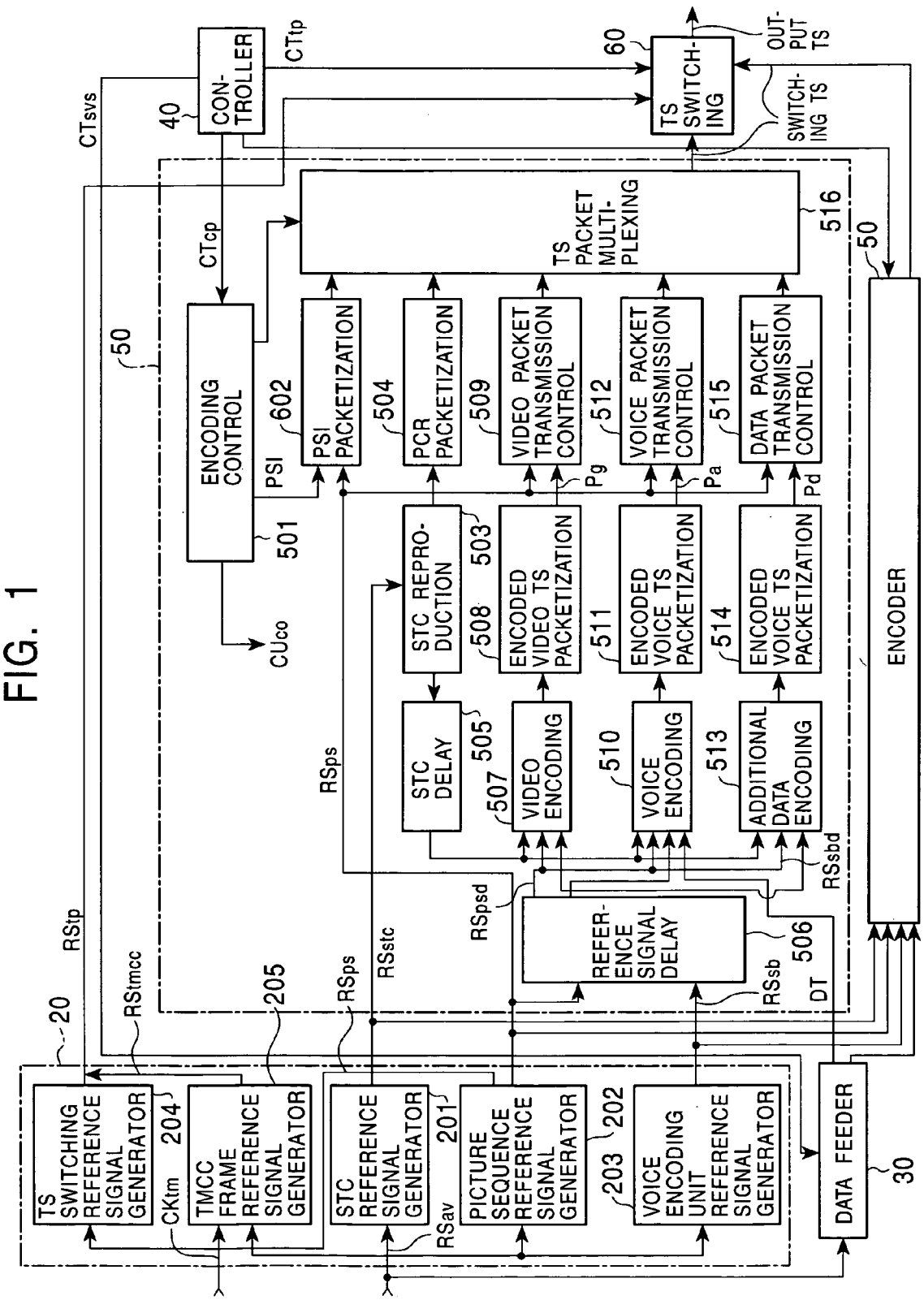
FIG. 1 shows the construction of a signal transmission apparatus.

One embodiment of the present invention is discussed, referring to the drawings. FIG. 1 shows the construction of a signal transmission apparatus 10. The signal transmission apparatus 10 includes a plurality of encoders. All encoders is identical in construction, and only one of the encoders 50 is representatively discussed.

A reference signal generator 20 generates a variety of reference signals required by the encoder 50 and TS switch 60 to be discussed later for processing MPEG2 TS's. An STC (System Time Clock) reference signal generator circuit 201 in the reference signal generator 20 generates a 27 MHZ oscillation signal which is synchronized with the picture and voice element data encoded from an encoding data element reference signal RSav such as a black burst. The STC reference signal generator circuit 201 frequency-divides the oscillation signal according to the MPEG2 Standard, and generates an STC reference signal RSstc synchronized with the data to be encoded. The STC reference signal generator circuit 201 supplies the generated STC reference signal RSstc to the encoder 50.

A picture sequence reference generator circuit 202 frequency-divides the frame period of an encoding data element reference signal RSav such as a black burst, generating a picture sequence reference signal RSps synchronized with encoding picture element data. The picture sequence reference generator circuit 202 supplies the generated picture sequence reference signal RSps to the encoder 50 and a TS switching reference signal generator circuit 204 to be discussed later.

A voice encoding reference signal generator circuit 203 generates a voice sampling clock signal synchronized with video element data to be encoded, from the encoding data element reference signal RSav such as a black burst. The voice encoding reference signal generator circuit 203 divides the voice sampling clock signal by the number of samples of voice encoding unit, thereby generating a voice encoding unit reference signal RSsb synchronized with the voice element data to be encoded. The generated voice encoding unit reference signal RSsb is fed to the encoder 50.

In response to the picture sequence reference signal RSps supplied from the picture sequence reference generator circuit 202, the TS switching reference signal generator circuit 204 generates a TS switching reference signal RStp indicating a TS switching position synchronized with the picture element data to be encoded, a predetermined duration of time earlier than the start end (I picture) of the GOP. The generated TS switching reference signal RStp is fed to the TS switch 60.

A TMCC (Transmission and Multiplexing Configuration Control) frame reference signal generator circuit 205 is used in Japanese BS (Broadcasting Satellite) digital broadcasting system. The Japanese BS digital broadcasting system adapts the carrier modulation system currently in widespread use, and a multiplex system such as the TMCC for designating parameters such as a convolution code rate and a time interleave length. In a synchronization process, the TMCC frame reference signal generator circuit 205 performs a pseudo-synchronization process based on a transmission path encoding clock CKtm supplied from a TS synthesizer (not shown), thereby generating a new transmission path encoding clock. In an asynchronization process, a transmission path encoding clock is generated based on a highly stable frequency of the encoding data element reference signal RSav. The TMCC frame reference signal generator circuit 205 frequency-divides the thus generated transmission path encoding clock according to the TMCC frame rate, thereby generating the TMCC frame reference signal RStmcc. The TMCC frame reference signal RStmcc is then fed to the TS switch 60. Information FS indicating a frame is supplied to the TS switching reference signal generator circuit 204 to synchronize the TS switching reference signal RStp with the TMCC frame.

An element data feeder 30 supplies the encoder 50 with element data signal DT such as picture element data, voice element data, and additional information in synchronization with the encoding data element reference signal RSav. The supply of the data signal DT from the element data feeder 30 to the encoder 50 is performed in response to the element data transmission control signal CTavs.

A controller 40 controls the element data feeder 30, the encoder 50, the TS switch 60, etc. in harmony. The element data transmission control signal CTavs is thus generated, and is supplied to the element data feeder 30. Also, the controller 40 generates and supplies an encoding control signal CTco to the encoder 50 to control the generation of the multiplexed TS packets in the encoder 50. The controller 40 also generates and supplies a TS switching control signal CTtp to the TS switch 60, thereby controlling the switching operation of the transmitted TS's.

An encoding control circuit 501 in the encoder 50 generates an operation control signal CUco in response to the encoding control signal CTco supplied from the controller 40. The encoding control circuit 501 supplies the operation control signal CUco to circuit block in the encoder 50, thereby controlling the circuit blocks in harmony. The encoding control circuit 501 uses the operation control signal CUco to ensure that no effective information TS packet is present ahead of the position of the start end of a GOP indicated by the picture sequence reference signal RSps, thereby forming a point at which TS switching is performed. Further, the encoding control circuit 501 creates association information between a program number and a PID (Packet Identification), and a PSI (Program Specific Information) for identifying a PID value of a stream forming the program, and supplies a PSI packetizer 502 with the association information and the PSI.

Using the PSI supplied from the encoding control circuit 501, the PSI packetizer 502 forms a TS packet of the PSI at the start end position of every picture to every three pictures including an I picture of the GOP indicated by the picture sequence reference signal RSps supplied from the reference signal generator 20. Among a plurality of encoders, the output TS's are made coincident with each other in the position and period of the TS packet of the PSI. To this end, no TS packet of the PSI is present ahead of the start end of the GOP to perform TS switching ahead of the start end of the GOP. Since a receiver apparatus receiving the output TS thus quickly acquires the PSI subsequent to the TS switching, early restoration is possible at a switching operation because of a trouble. The PSI TS packet produced in the PSI packetizer 502 is then supplied to a TS packet multiplexor circuit 516.

An STC reproducing circuit 503 reproduces an STC in synchronization with the STC reference signal RSstc supplied from the reference signal generator 20, and then supplies a PCR (Program Clock Reference) packetizer circuit 504 and an STC delay circuit 505 with the STC.

The PCR packetizer circuit 504 samples the STC value supplied from the STC reproducing circuit 503 at the position of the start end of the GOP, indicated by the picture sequence reference signal RSps supplied from the reference signal generator 20, namely, at the beginning of every picture to every three pictures including the I picture, thereby forming a PCR TS packet. Across the plurality of encoders, the output TS's are made coincident with each other in the timing and period of the PCR packet. In this way, the PCR is formed at the start end of the GOP, and no PCR TS packet is present ahead of the start end position of the GOP so that the TS switching is performed ahead of the start end position of the GOP. Since a receiver apparatus receiving the output TS thus quickly acquires the PCR subsequent to the TS switching, early restoration is possible at a switching caused by any trouble. The PCR TS packet produced in the PCR packetizer circuit 504 is supplied to the TS packet multiplexor circuit 516.

To delay the STC, the STC delay circuit 505 adds, to the STC value supplied from the STC reproducing circuit 503, a data value about a logically calculated required time from when the signal of the picture element data is supplied to the encoder 50 to when the receiver apparatus presents a picture. By adding the data value to the STC value, the values of PTS (Presentation Time Stamp), DTS (Decoding Time Stamp), and PCR of the pictures and voices and data in association with the pictures and voices in the TS output from the encoder 50 are synchronized. For use as the PTS, the delayed STC is supplied to a video encoder circuit 507, a voice encoder circuit 510, and an additional data encoder circuit 513.

A reference signal delay circuit 506 adds, to the value of the picture sequence reference signal RSps and the voice encoding unit reference signal RSsb from the reference signal generator 20, the data value of logically calculated required time when the signal of the picture element data and the voice element data is supplied to the encoder 50 to when the signal of the picture element data and the voice element data reaches the TS packet multiplexor circuit 516. The picture sequences and the voice encoding units in the output TS's from the encoders 50 are respectively synchronized with each other. The delayed picture sequence reference signal RSpsd is applied to the video encoder circuit 507, the voice encoder circuit 510, and the additional data encoder circuit 513 as a reference for encoding. The delayed voice encoding unit reference signal RSsbd is applied to the voice encoder circuit 510 for use as a reference for encoding.

The video encoder circuit 507 encodes the picture element data signal supplied from the element data feeder 30, thereby forming a picture PES packet. Based on the delayed picture sequence reference signal RSpsd supplied from the reference signal delay circuit 506, the video encoder circuit 507 performs encoding according to a picture type indicated by the delayed picture sequence reference signal RSpsd, thereby making the GOPs across the encoders for TS switching synchronized. For a TS switching period as a preparation duration, encoding is performed by adjusting a compression rate so that the maximum value of the encoding information is equal to or smaller than a value that is obtained by subtracting a constant value from the average of the encoding information amount in a normal period of time different from the TS switching period. Subsequent to the TS switching, the GOP does not depend on the GOP prior to the TS switching. The video encoder circuit 507 that generates the TS packet to be transmitted subsequent to the TS switching performs encoding subsequent to the TS switching as a closed GOP. The one GOP encoded data thus obtained is split into one or a plurality of packets, thereby forming PES packets. The start end of the GOP is tagged with a sequence header and the PTS as the header of the PES. The PES packet is then supplied to an encoded video TS packetizer circuit 508 for splitting. Header information is then added to form a TS packet as large as 188 bytes. In this way, the TS packet Pg formed by the encoded video TS packetizer circuit 508 is fed to a video packet transmission control circuit 509.

The video packet transmission control circuit 509 controls the transmission amount of the TS packet Pg of the picture element data. The average of the encoding information amount of picture is managed by the encoding control circuit 501 with a relatively long period of time. The amount of information varies on a per GOP basis or a frame unit, depending on the difficulty of encoding. If data is multiplexed with the amount of information varying, and is then transmitted over a transmission path of a constant amount of information, overflow occurs on the transmission path that is set for an average transmission rate. A transmission path set for the maximum transmission rate can be used. However, since the amount of information is not always large, the transmission efficiency becomes degraded. For this reason, the transmission amount of the picture TS packet is controlled to average the amount of transmitted information. The resulting TS packet Pg is then supplied to the TS packet multiplexor circuit 516. The video packet transmission control circuit 509 reduces the transmission information amount for the TS switching period to an amount between the average encoding information amount for the normal period and the maximum encoding information amount for the TS switching period. As will be discussed later, information such as the voice element data is transmitted in a larger amount than during the normal period of time. The supply of the TS packets of the picture element data is controlled so that the output timing of the picture TS packet leads in time.

The voice encoder circuit 510 encodes the voice data supplied from the element data feeder 30 in accordance with the MPEG2 Standard, thereby forming a voice PES packet. The encoding of the voice element data is performed in synchronization with the voice encoding unit reference signal RSbsd output from the reference signal delay circuit 506. The encoding voice data of a voice encoding unit present immediately subsequent to the beginning of the GOP indicated by the delayed picture sequence reference signal RSpsd output from the reference signal delay circuit 506 becomes the start end of the PES packet. One or a plurality of voice encoding units is handled as one PES packet, and a PTS is placed at the beginning of the PES packet. The PES packet is fed to an encoded voice TS packetizer circuit 511 to be split. Header information is attached to the split PES packet and a 188 byte TS packet is thus formed. The TS packet Pa created by the encoded voice TS packetizer circuit 511 is fed to a voice packet transmission control circuit 512.

The voice packet transmission control circuit 512 controls the transmission amount of the voice TS packet Pa. The average of the encoding information in the AAC Standard is managed by the encoding control circuit 501 with a relatively long period of time. The amount of information of an encoding unit varies, depending on the difficulty of encoding. If data is multiplexed with the amount of information varying, and is then transmitted over a transmission path of a constant amount of information, overflow occurs and transmission efficiency is degraded. For this reason, the transmission amount of the voice TS packet is averaged and is then fed to the TS packet multiplexor circuit 516.

An additional data encoder circuit 513 encodes additional data, such as a caption, in association with pictures and voices, in accordance with a predetermined standard, and performs PES packetization together with a video frame and a GOP. A PTS is attached to a PES packet positioned at the beginning of the GOP. The encoding of the additional data is performed based on the delayed picture sequence reference signal RSpsd. The PES packet is supplied to an encoded data TS packetizer circuit 514 to be split. Header information is then attached, forming a 188 byte TS packet. The TS packet created by the encoded data TS packetizer circuit 514 is fed to a data packet transmission control circuit 515.

The data packet transmission control circuit 515 controls the transmission amount of the additional data TS packet Pd. The information amount of the additional data typically varies. If a large quantity of TS packets is concurrently transmitted, overflow is generated on the transmission path. The transmission amount of the additional data TS is averaged, and is then supplied to the TS packet multiplexor circuit 516. The data packet transmission control circuit 515 controls the supply of the TS packets so that the transmission information amount for the TS switching period is larger than the average encoding information amount for the normal period of time by a certain amount. An increase in the additional data transmission amount is balanced with a reduction in the video transmission information amount.

The TS packet multiplexor circuit 516 multplexes the TS packets from the PSI packetizer 502, the PCR packetizer circuit 504, the video packet transmission control circuit 509, the voice packet transmission control circuit 512, and the data packet transmission control circuit 515, and supplies the TS switch 60 with the multiplexed packet as a switching TS.

The TS switch 60 performs TS switching on a plurality of switching TS's supplied from the plurality of encoders 50 at a position indicated by the TS switching reference signal RStp supplied from the reference signal generator 20, thereby creating a single stream output TS. Besides switching the switching TS's supplied from the encoders 50, the TS switch 60 may performs TS switching on switching TS's supplied from a TS reproducing device, a TS interface device, etc. The TS reproducing device generates a TS equivalent to the above-discussed switching TS by performing the same process carried out by the encoder 50 at the time of recording the TS, or at the time of converting into a desired format when the data encoded in a different format is reproduced. The TS interface device in a remote place generates a TS equivalent to the above-referenced switching TS by performing the same process carried out by the encoder 50.

Figure 2:
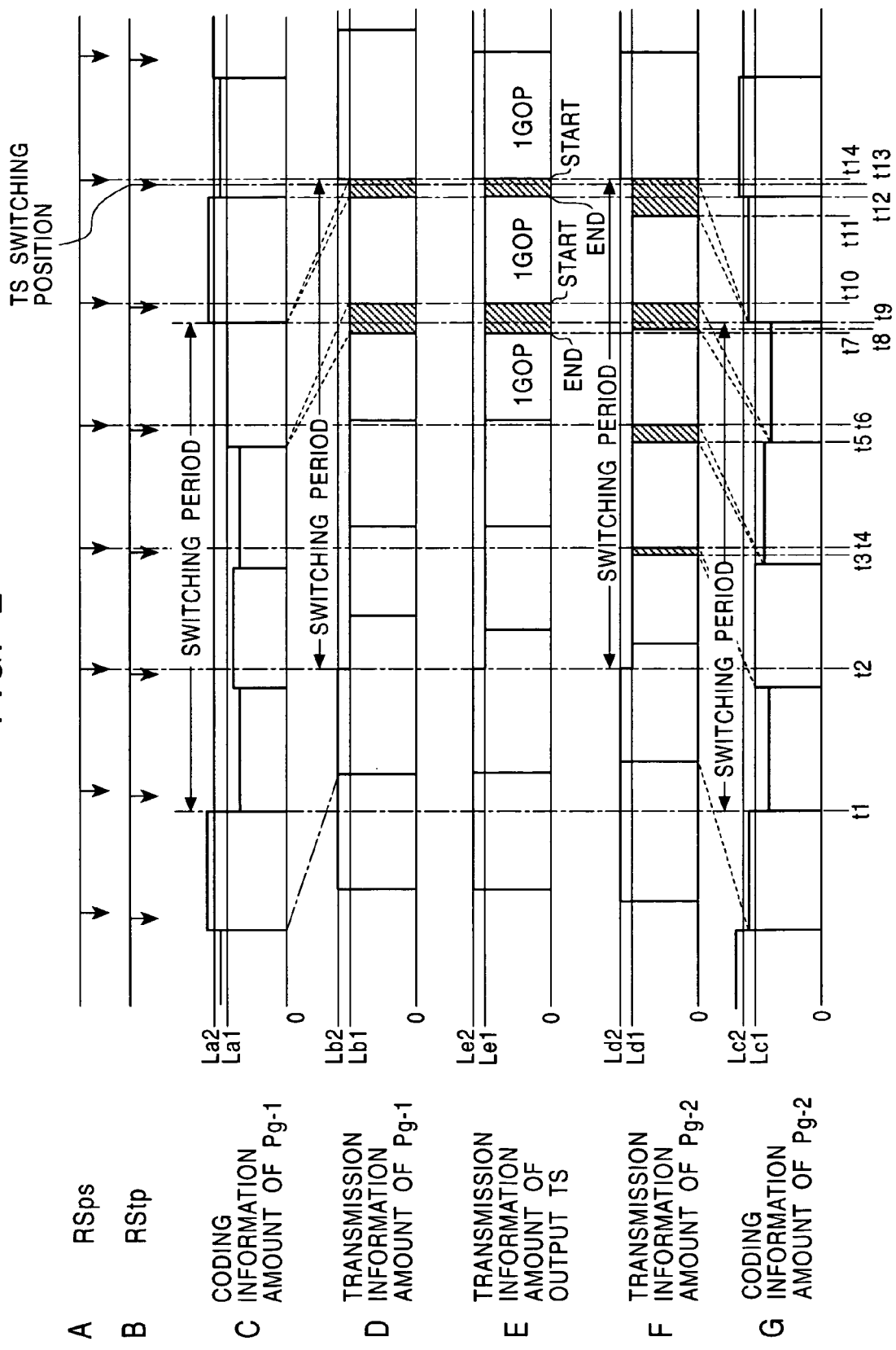
FIGS. 2A–2G show a concatenation operation for concatenating picture element data.

The operation of the signal transmission apparatus 10 is now discussed. FIGS. 2A–2G show the TS switching operation for switching between the switching TS produced by a first encoder 50-1 and the switching TS produced by a second encoder 50-2 to concatenate picture data. FIG. 2A shows the start position of the GOP indicated by the picture sequence reference signal RSps, and FIG. 2B shows the TS switching position indicated by the TS switching reference signal RStp.

FIG. 2C shows the encoding information amount per GOP of the TS packet Pg-1 created by the encoder 50-1, and FIG. 2D shows the transmission information amount of the TS packet Pg-1. Referring to FIG. 2c, an information amount La2 is an average of the encoding information amount for the normal period of time, and an information amount La1 is a maximum value of the encoding information amount for the TS switching period. Referring to FIG. 2D, an information amount Lb2 is the transmission information amount for the normal period, and an information amount Lb1 is the transmission information amount for the switching period.

FIG. 2G shows the encoding information amount per GOP of the TS packet Pg-2 created in the encoder 50-2, and FIG. 2F shows the transmission information amount of the TS packet Pg-2. Referring to FIG. 2G, an information amount Lc2 is an average of the encoding information amount for the normal period of time, and an information amount Lc1 is a maximum value of the encoding information amount for the TS switching period. Referring to FIG. 2F, an information amount Ld2 is the transmission information amount for the normal period, and an information amount Ld1 is the transmission information amount for the switching period.

FIG. 2E shows the transmission information amount of the output TS output from the TS switch 60. An information amount Le2 is the transmission information amount for the normal period, and an information amount Le1 is the transmission information amount for the switching period.

The TS switching is performed at time point t13 in synchronization with the TS switching reference signal RStp. When the switching TS output from the encoder 50-1 is switched to the switching TS output from the encoder 50-2, a predetermined number of GOP switching periods for the GOP at time point t13 is set in the switching TS's output from the encoders 50-1 and 50-2. Referring to FIG. 2A, for example, a switching period is set to be from the beginning at time point t2, three GOPs earlier than time point t13 to the end position of the GOP of time point t13 at time point t14. The switching period from time point t1 to time point t8 in the encoding process in the encoders 50-1 and 50-2 corresponding to the switching time of the output TS packet from time point t2 to time point t14 is set up.

At the start position of the switching, at time point t1, the video encoder circuit 507 in the encoder 50-1 performs encoding process so that the encoding information amount of the TS packet Pg-1 is smaller than the information amount La1. The video packet transmission control circuit 509 limits the transmission information amount of the TS packet Pg-1 to the information amount Lb1 at the start end t2 of the switching period.

Even if the transmission information amount is reduced from the information amount Lb2 to the information amount Lb1, the encoding information amount is smaller than the information amount La1, and the information amount to be transmitted is small. The output timing of the switching TS leads that during the normal period. If the output timing leads, the start end of the GOP of the switching TS leads the timing of the picture sequence reference signal RSps.

Similarly, the video encoder circuit 507 in the encoder 50-2 performs encoding process so that the encoding information amount of the TS packet Pg-2 is smaller than the information amount Lc1 at the start end t1 of the switching period. At the start end time t2 of the switching period, the video packet transmission control circuit 509 limits the transmission information amount of the TS packet Pg-2 to the information amount Lb1.

Even if the transmission information amount is reduced from the information amount Ld2 to the information amount Ld1, the encoding information amount is smaller than the information amount Lc1, and the information amount to be transmitted is small. The output timing of the switching TS leads that during the normal period. If the output timing leads, the start end of the GOP of the switching TS leads the timing of the picture sequence reference signal RSps.

When the start end of the GOP leads the timing of the picture sequence reference signal RSps, the switching TS's are output from the encoders 50-1 and 50-2 in synchronization with the picture sequence reference signal RSps. In this way, a no-signal period without any packet containing information is set in succession to the end of the preceding GOP. For example, referring to FIG. 2F, the encoder 50-2 provides no-signal periods from time point t3 to time point t4, time point t5 to time point t6, time point t8 to time point t10, and time point t11 to time point t14. Referring to FIG. 2D, the encoder 50-1 provides no-signal periods from time point t7 to time point t10, and time point t12 to time point t14.

The output timing of the switching TS's from the encoders 50-1 and 50-2 leads that in the normal period so that the encoders 50-1 and 50-2 are set to be in no-signal period at time point t13 at the TS switching. Any switching TS containing information is not transmitted. The switching TS from the encoder 50-1 is switched to the switching TS from the encoder 50-2 within the no-signal period, while the switching TS is synchronized with the picture sequence reference signal RSps. A PTS is placed at the beginning of the first output TS subsequent to the TS switching. Since the receiver apparatus receives not only the start of the GOP subsequent to the TS switching but also the PTS, the receiver apparatus is quickly restored at the switching due to any trouble.

Referring to FIG. 3A–3F, a concatenation operation of voice data is discussed. As shown, corresponding to FIGS. 2A–2D, FIGS. 3A–3D respectively show the start end of the GOP represented by the picture sequence reference signal RSps, the TS switching point represented by TS switching reference signal RStp, the encoding information amount per GOP of the TS packet Pg-1 formed in the encoder 50-1, and the transmission information amount of the TS packet Pg-1.

Figure 3:
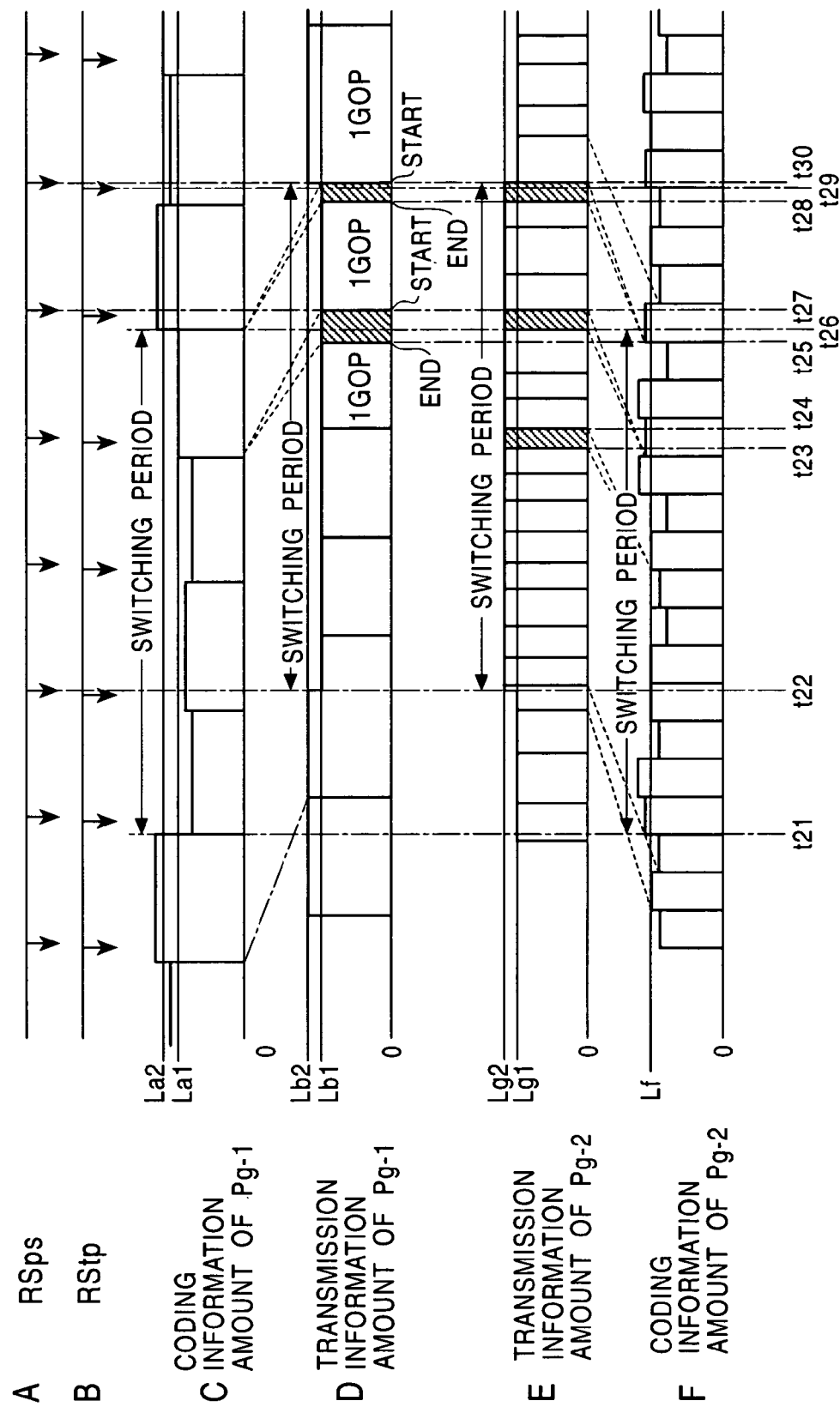
FIGS. 3A–3F show a concatenation operation for concatenating voice element data.

FIG. 3F shows the encoding information amount of the voice TS packet Pg-2 from the encoder 50-2, and FIG. 3E shows the transmission information amount of the TS packet Pg-2. Referring to FIG. 3F, an information amount Lf represents an average of the encoding information for the normal period. Referring to FIG. 3E, an information amount Lg1 represents the transmission information amount for the normal period, and an information amount Lg2 represents the transmission information amount for the switching period.

At time point t21, i.e., at the start end of the switching period, the video encoder circuit 507 in the encoder 50-1 performs an encoding process so that the encoding information amount is smaller than the information amount La1. At time point t22, i.e., at the start end of the switching period, the video packet transmission control circuit 509 limits the transmission information amount to the information amount Lb1.

At time point t22, i.e., at the start end of the switching, the voice packet transmission control circuit 512 in the encoder 50-2 increases the transmission information amount of the voice TS packet Pg-2 to the information amount Lg2 from the information amount Lg1.

The transmission information amount is reduced from the information amount Lb2 to the information amount Lb1 in the encoder 50-1 as in the concatenation of the picture data. The encoding information amount is set to be smaller than the information amount La1, and the information amount to be transmitted is small. The output timing of the switching TS thus leads that of the TS in the normal period.

Since the transmission information amount is increased from the information amount Lg1 to the information amount Lg2 in the encoder 50-2, the output timing of the switching TS is allowed to lead the output timing in the normal period.

The output timing of the picture and voice switching TS's lead. When the start end of the GOP leads the timing of the picture sequence reference signal RSps, the switching TS's are output from the encoders 50-1 and 50-2 in synchronization with the picture sequence reference signal RSps. In this way, a no-signal period without any packet containing information is arranged. For example, referring to FIG. 2F, the encoder 50-2 provides no-signal periods from time point t23 to time point t24, time point t26 to time point t27, and time point t28 to time point t30. The encoder 50-1 provides no-signal periods from time point t25 to time point t27, and time point t28 to time point t30.

The output timing of the switching TS's from the encoders 50-1 and 50-2 leads that in the normal period so that the encoders 50-1 and 50-2 are set to be in no-signal period at time point t29 at the TS switching. Any switching TS containing information is not transmitted. The switching TS from the encoder 50-1 is switched to the switching TS from the encoder 50-2 within the no-signal period to form the output TS while the switching TS is synchronized with the picture sequence reference signal RSps. A PTS is placed at the beginning of the first output TS subsequent to the TS switching. Since the receiver apparatus receives not only the start of the GOP subsequent to the TS switching but also the PTS, the receiver apparatus is quickly restored at the switching due to any trouble.

When the additional data switching TS is used for TS switching, the output timing of the switching TS leads to set up the no-signal period by increasing the transmission information amount during the switching period in the same manner as in the voice. No chart is here presented to illustrate the additional data switching TS. During the no-signal period, the TS switching is performed in the same way as already discussed. The receiver apparatus is quickly restored in the event of switching due to any trouble.

In the above embodiment, the TS switching is performed based on the TS switching reference signal RStp. To create a signal having a frame structure of Transmission and Multiplexing Configuration Control (TMCC), processing in each block is performed in synchronization with the TMCC superframe. The transmission of the end of the TMCC superframe is completed prior to the TS switching, while the start of a next TMCC superframe is then transmitted subsequent to the TS switching point. In this way, an incomplete TMCC superframe adversely affecting the signal processing of the pictures and voices is prevented from residing in the concatenated TS's.

Discussed next is an external TS processing for the TS switching using external TS's supplied from a remote station through a network, etc.

Figure 4:
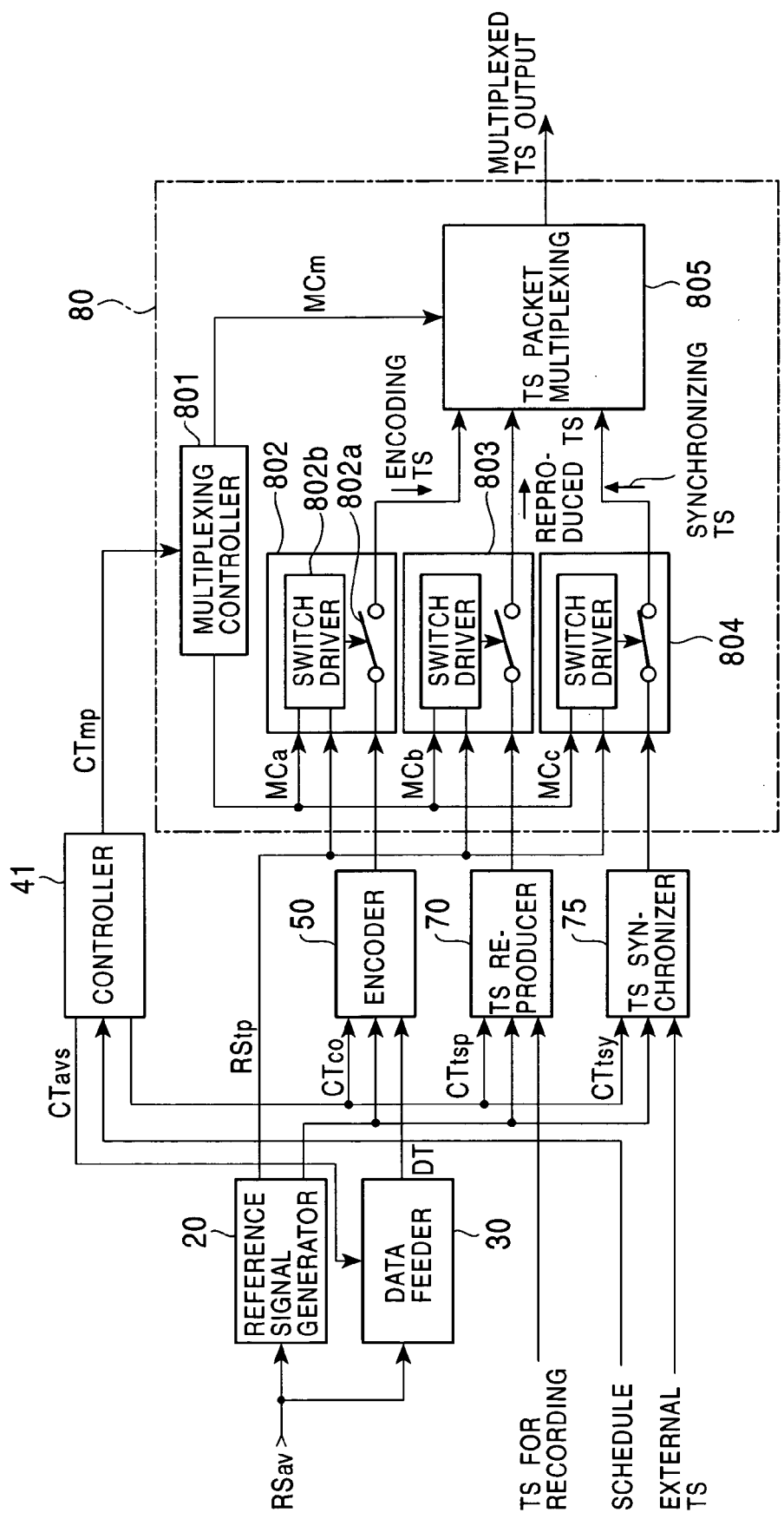
FIG. 4 is a block diagram showing the construction of the signal transmission apparatus for external TS processing.

FIG. 4 shows the construction of the external TS processing. As shown, components identical to those with reference to FIG. 1 are designated with the same reference numerals.

A controller 41 controls an encoder 50, a TS reproducing unit 70, a TS reproducer 70, a TS synchronizer 75, a multiplexor 80, etc. in harmony. The controller 41 generates and supplies the above-described element data transmission control signal CTavs to the element data feeder 30. The controller 41 generates and supplies the encoding control signal CTco to the encoder 50, thereby controlling the generation of the encoding TS as a switching TS. The controller 41 generates and supplies the TS reproduction control signal CTtsp to the TS reproducer 70, thereby controlling the TS reproduction operation for generating the reproduced TS as a switching TS. The controller 41 generates and supplies the TS synchronization control signal CTtsy to the TS synchronizer 75, thereby synchronizing external TS's supplied from outside own station and feeding the external TS's to the multiplexor 80. Further, the controller 41 acquires beforehand the schedule of an external station TS. Making use of the schedule, the controller 41 generates a TS multiplexing control signal CTmp for performing the TS switching for the TS's including the external station's TS, and supplies the TS multiplexing control signal CTmp to the multiplexor 80. The controller 41 thus controls the multiplexor 80 in the generation operation of the output multiplex TS.

The TS reproducer 70 stores recorded TS's such as commercials. The TS reproducer 70 receives, from the reference signal generator 20, the picture sequence reference signal RSps and the voice encoding unit reference signal RSsb. In response to the TS reproduction control signal CTtsp supplied from the controller 41, the TS reproducer 70 reproduces the recording TS in synchronization with the reference signal, and then supplies the reproduced TS to a switch driver 803 in the multiplexor 80.

The TS synchronizer 75 receives the external TS while also receiving, from the reference signal generator 20, the picture sequence reference signal RSps and the voice encoding unit reference signal RSsb. In response to the TS synchronization control signal CTtsy supplied from the controller 41, the TS synchronizer 75 supplies a switch driver 804 in the multiplexor 80 with the external station TS synchronized with the reference signal. As already described with reference FIGS. 2A–2G and FIGS. 2A–2F, the external station TS has a no-signal period at the switching point for TS switching.

The multiplexor 80 includes a multiplexing controller 801, TS switch drivers 802–804, and a TS packet multiplexor circuit 805. The multiplexing controller 801 generates switch control signals MCa, MCb, and MCc in response to the TS multiplexing control signal CTmp supplied from the controller 41. The multiplexing controller 801 supplies the TS switch drivers 802–804 with the switch control signals MCa, MCb, and MCc, thereby controlling the switching operation in each TS switch driver. The control of the switching operation is performed so that a plurality of TS switch drivers do not concurrently supply the TS packet multiplexor circuit 805 with the TS packets. In response to the TS multiplexing control signal CTmp, the multiplexing controller 801 generates and supplies a multiplexing control signal MCm to the TS packet multiplexor circuit 805, thereby controlling the multiplexing operation in the TS packet multiplexor circuit 805.

The TS switch driver 802, composed of a switch 802a and a switch driver circuit 802b, supplies the coded TS supplied from the encoder 50 to the switch 802a. The TS switch driver 802 also supplies the switch driver circuit 802b with the TS switching reference signal RStp supplied from the reference signal generator 20 and the switch control signal MCa supplied from the multiplexing controller 801. The switch driver circuit 802b controls the on/off of the switch 802a in accordance with the operation mode based on the switch control signal MCa. The switch driver circuit 802b drives the switch 802a to perform the switching of the operation mode in synchronization with the TS switching reference signal RStp. With the switch driver circuit 802b turning on the switch 802a, the encoded TS from the encoder 50 is fed to the TS packet multiplexor circuit 805.

The TS switch drivers 803 and 804 are identical in construction to the TS switch driver 802. The TS switch driver 803 drives the switch thereof in response to the TS switching reference signal RStp and the switch control signal MCb. With the switch turned on, the reproduced TS from the TS reproducer 70 is fed to the TS packet multiplexor circuit 805. The TS switch driver 804 drives the switch thereof in response to the TS switching reference signal RStp and the switch control signal MCb. With the switch turned on, the external station TS from the TS synchronizer 75 is supplied to the TS packet multiplexor circuit 805.

The TS packet multiplexor circuit 805 assembles the TS's supplied from the TS switch drivers 802–804 into a single stream multiplexed TS output.

FIGS. 5A–5D show the operation for processing the external station TS. For example, a main program to be broadcast is supplied as an external station TS, and a TS such as a commercial is multiplexed onto the main program.

Figure 5:
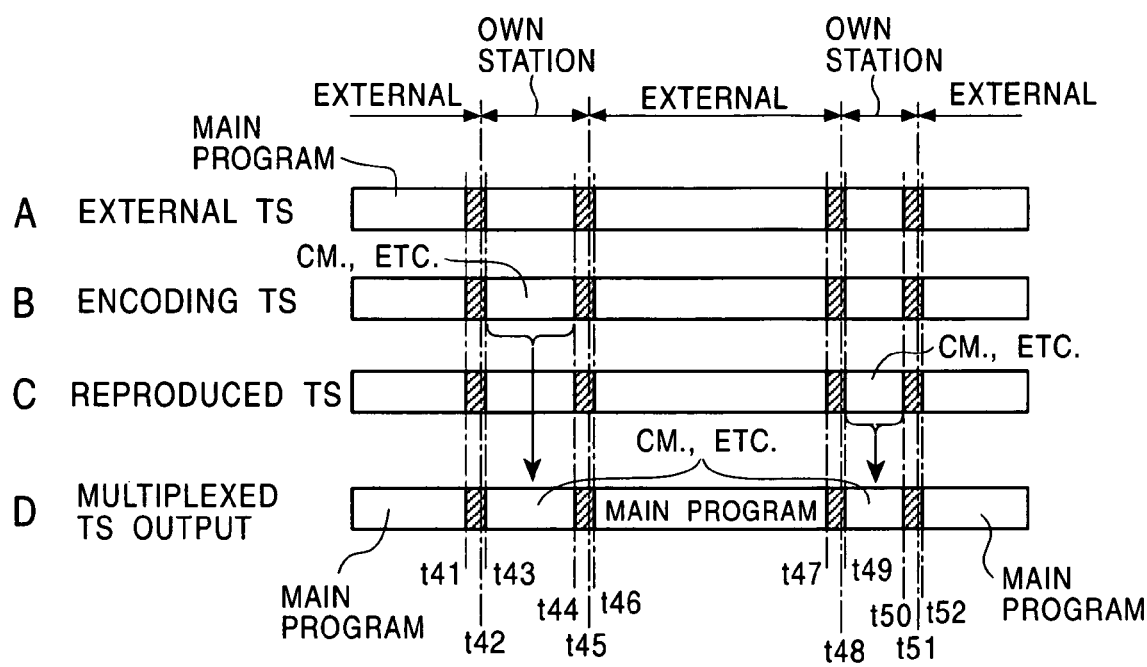
FIGS. 5A–5D show the operation of the external TS processing.

FIG. 5A shows an external station TS that has been subjected to a synchronization process in the TS synchronizer 75, FIG. 5B shows an encoded TS from the encoder 50, and FIG. 5C shows a reproduced TS from the TS reproducer 70.

In accordance with the supplied schedule, TS switching is performed at time points t42, t45, t48, and t51. The main program from the external station TS may be switched to a commercial (CM) based od the element data signal DT from the element data feeder 30 or to a commercial reproduced in the TS reproducer 70. Conversely, the commercial is switched to the main program. In such an operation, the encoder 50, the TS reproducer 70, and the TS synchronizer 75 places the above-referenced switching period at each TS switching point to control the encoding information amount and the transmission information amount, create the no-signal period, and then perform the TS switching.

For example, a duration from time point t41 to time point t43 is set as a switching period for TS switching at time point t42, and the encoding information amount and the transmission information amount are controlled so that a no-signal period occurs at time point t42. At time point t42, the switch 802a of the TS switch driver 802 is turned on, while the switch 804a of the TS switch driver 804 is turned off. The multiplexed TS output from the TS packet multiplexor circuit 805 is switched from the main program to a commercial or the like as shown in FIG. 5D. As for the TS switching at time point t45, a duration from time point t44 to time point t46 is set, the switch 802a of the TS switch driver 802 is turned off while the switch 804a of the switch driver 804 is turned on. The multiplexed TS output from the TS packet multiplexor circuit 805 is switched from the commercial or the like to the main program.

Similarly, a switching period from time point t47 to time point t49 and a switching period from time point t50 to time point t51 are respectively set for the TS switching at time point t48 and the TS switching at time point t51. The switch 803*a* of the TS switch driver 803 and the switch 804*a* of the TS switch driver 804 are controlled so that the multiplexed TS output from the TS packet multiplexor circuit 805 is switched from the main program to the commercial or the like reproduced by the TS reproducer 70 or from the commercial or the like to the main program.

The programs and commercials are switched in this way without no transients introduced by setting the switching period and controlling the encoding information amount and the transmission information amount.

Figure 6:
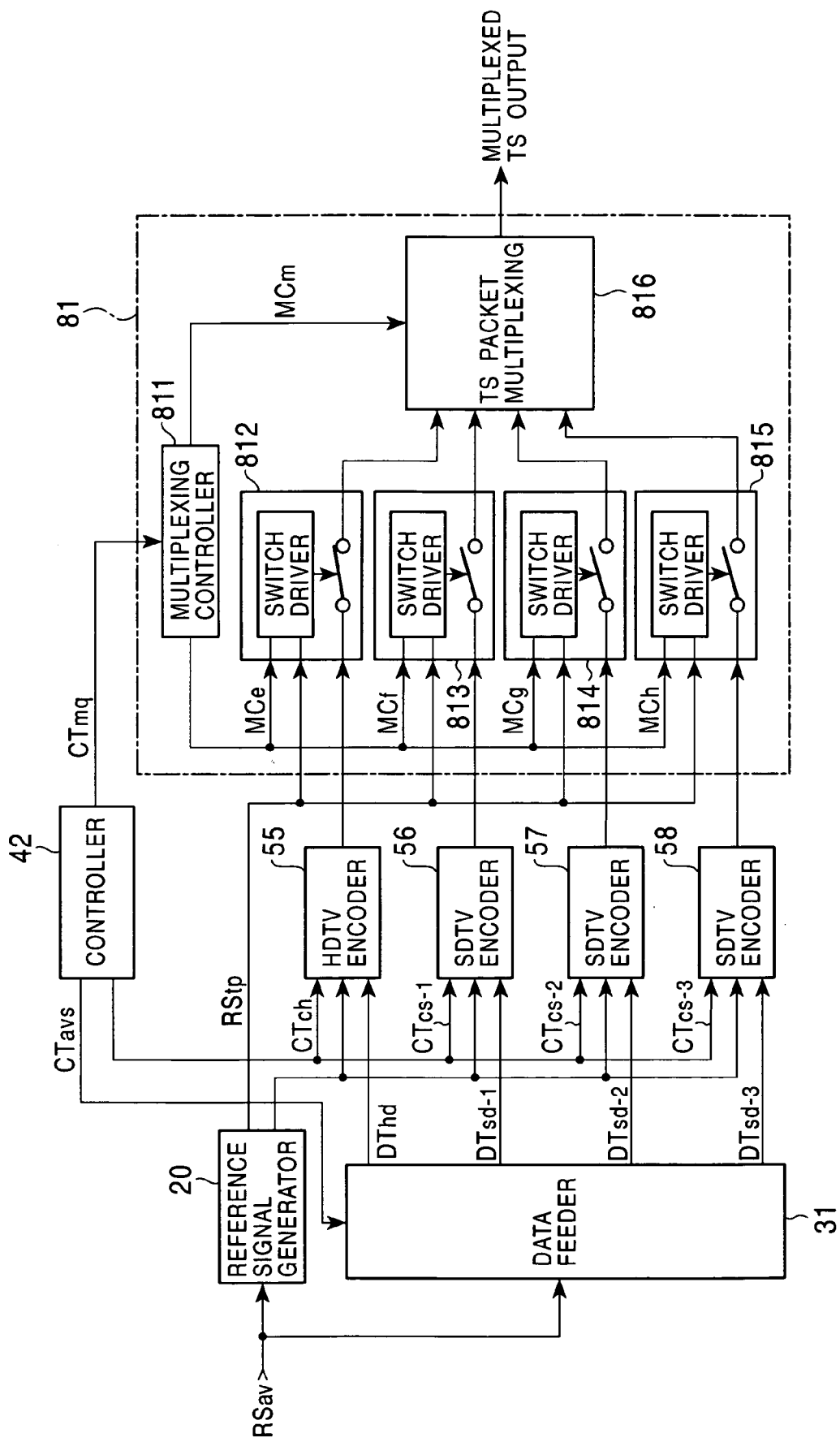
FIG. 6 is a block diagram of the signal transmission apparatus for mixing and multiplexing process.

FIG. 6 shows an arrangement for a mixing and multiplexing process which mixes and multiplexes an HDTV (High Definition TV) program and an SDTV (Standard Definition TV). As shown, elements identical to those described with reference to FIG. 1 and FIG. 4 are designated with the same reference numerals, and the detailed description thereof is not repeated.

A controller 42 controls an HDTV encoder 55, SDTV encoders 56–58, a multiplexor 81, etc. in harmony. The controller 42 generates and supplies the above-referenced element data transmission control signal CTavs to an element data feeder 31. The controller 42 generates and supplies an encoding control signal CTch to the HDTV encoder 55, thereby controlling the generation of an HDTV encoding TS as a switching TS. Further, the controller 42 respectively generates and supplies encoding control signals CTct-1 through CTcs-3 to the SDTV encoders 56–58, thereby controlling the generation of SDTV encoding TS's as a switching TS. The controller 42 generates and supplies a TS multiplexing control signal CTmq to the multiplexor 81, thereby controlling the generation of a multiplexing TS in the multiplexor 81.

In synchronization with the encoding data element reference signal RSav, the element data feeder 31 generates a video of 1920×1080 pixels (59.94 fields/s), and HDTV data signal DThd formed of voices and data relating to the video, and supplies these pieces of data to the HDTV encoder 55. The element data feeder 31 generates a video of 720×480 pixels (59.94 fields/s) and a plurality of pieces of SDTV data signal DTsd formed of voices and data relating to the video and supplies first SDTV data signal DTsd-1 to the SDTV encoder 56 and second SDTV data signal DTsd-2 to the SDTV encoder 57. Third SDTV data signal DTsd-3 is supplied to the SDTV encoder 58. The supply of the data signal from the element data feeder 31 to the SDTV encoders 56, 57, and 58 is performed in response to the element data transmission control signal CTavs supplied from the controller 42.

The HDTV encoder 55 encodes the HDTV data signal DThd in response to the encoding control signal CTch coming from the controller 42, and generates and supplies the HDTV encoding TS as a switching TS to the multiplexor 81. The generation of the HDTV encoding TS is performed in synchronization with the reference signals such as the picture sequence reference signal RSps and the voice encoding unit reference signal RSsb supplied from the reference signal generator 20.

Similarly, the SDTV encoder 56 generates an SDTV encoding TS using the first SDTV data signal DTsd-1 and supplies the SDTV encoding TS to the multiplexor 81. As the SDTV encoder 56, the SDTV encoder 57 and the SDTV encoder 58 respectively generate a second SDTV encoding TS and a third SDTV encoding TS using the first SDTV data signal DTsd-2 and the third SDTV data signal DTsd-3 and supplies the second SDTV encoding TS and the third SDTV encoding TS to the multiplexor 81. The generation of the SDTV encoding TS's are respectively performed in synchronization with the encoding control signals CTcs-1 through CTcs-3 supplied from the controller 42.

The multiplexor 81 includes a multiplexing controller 811, TS switch drivers 812–815, and a TS packet multiplexor circuit 816. Like the multiplexing controller 801, the multiplexing controller 811 generates switch control signals MCe, MCf, MCg, and MCh based on the TS multiplexing control signal CTmq coming from the controller 42, and respectively supplies the switch control signals MCe, MCf, MCg, and MCh to the TS switch drivers 812 through 815, thereby controlling the switching operation of these TS switch drivers 812 through 815. The switching operation is controlled so that the TS packet multiplexor circuit 816 may not simultaneously receive TS packets from the TS switch driver supplied with the HDTV encoding TS and the TS switch driver supplied with the SDTV encoding TS. The multiplexing controller 811 generates the multiplexing control signal MCm in response to the TS multiplexing control signal CTmq, and supplies the multiplexing control signal MCm to the TS packet multiplexor circuit 816, thereby controlling the multiplexing operation of the TS packet multiplexor circuit 816.

Like the TS switch driver 802, the TS switch driver 812 includes a switch 812*a* and a switch driver circuit 812*b* (not shown). The TS switch driver 812 feeds the HDTV supplied from the HDTV encoder 55 to the switch 812*a* while supplying the switch driver circuit 812*b* with the TS switching reference signal RStp coming from the reference signal generator 20 and the switch control signal MCe coming from the multiplexing controller 811. The switch driver circuit 812*b* controls the on/off state of the switch 812*a* to an operation mode responsive to the switch control signal MCe. The switching of the operation mode is performed in synchronization with the TS switching reference signal RStp. With the switch driver circuit 812*b* turning on the switch 812*a*, the HDTV encoding TS from the HDTV encoder 55 is fed to the TS packet multiplexor circuit 816.

Each of the TS switch drivers 813, 814, and 815 has a construction similar to that of the TS switch driver 812. The TS switch driver 813 performs a switching operation in response to the TS switching reference signal RStp and the switch control signal MCf. With the TS switch driver 813 turned on, the encoded TS from the SDTV encoder 56 is fed to the TS packet multiplexor circuit 816. Similarly, the TS switch driver 814 performs a switching operation in response to the TS switching reference signal RStp and the switch control signal MCg. With the TS switch driver 814 turned on, the SDTV encoding TS from the SDTV encoder 57 is fed to the TS packet multiplexor circuit 816. The TS switch driver 815 performs a switching operation in response to the TS switching reference signal RStp and the switch control signal MCh. With the TS switch driver 815 turned on, the SDTV encoding TS from the SDTV encoder 58 is fed to the TS packet multiplexor circuit 816.

The TS packet multiplexor circuit 816 assembles the encoding TS's supplied from the TS switch drivers 812 through 815 into a single stream and outputs the single stream as a multiplexed TS output.

Figure 7:
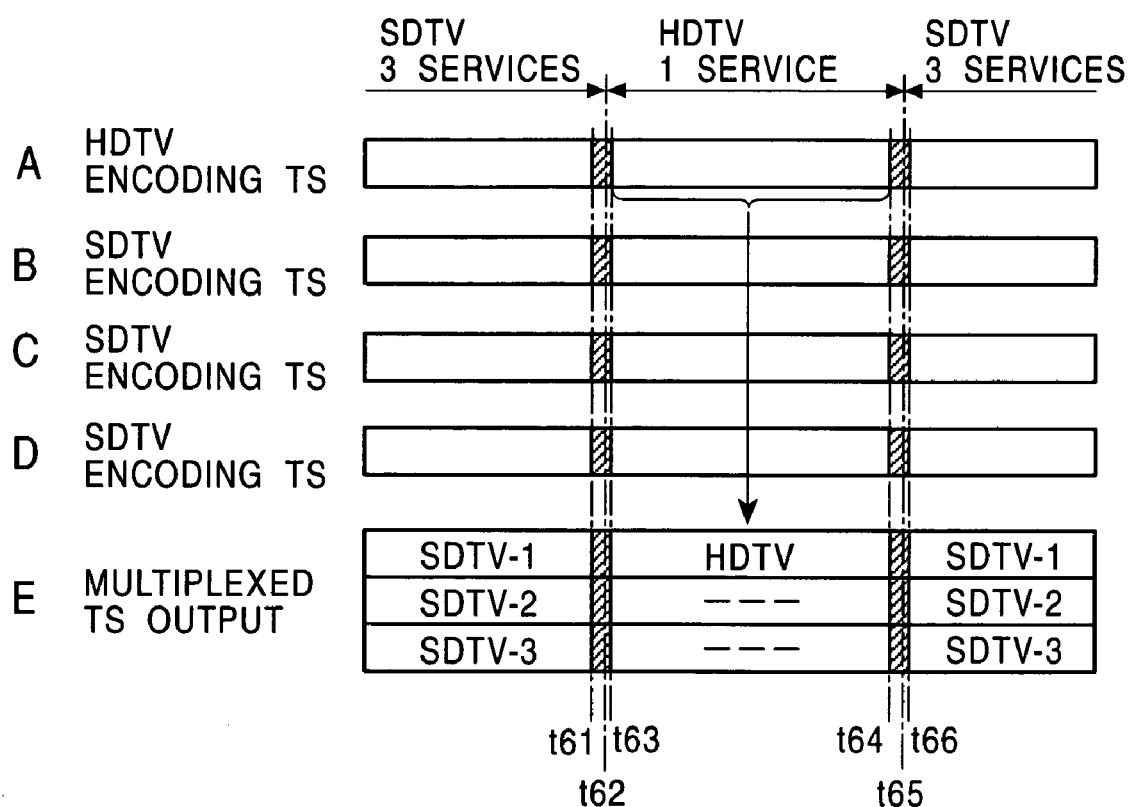
FIGS. 7A–7E illustrate the mixing and multiplexing processing.

FIGS. 7A–7E show the operation of the mixing and multiplexing process. FIG. 7A shows the HDTV encoding TS from the SDTV encoder 55. FIGS. 7B–7D show the SDTV encoding TS's respectively supplied from the SDTV encoders 56–58.

With the TS switching performed at time point t62, one HDTV program service replaces three SDTV program services. At time point t65, the HDTV program service is switched back to the three SDTV program services. The HDTV encoder 55, and the SDTV encoders 56–58 set up switching periods at each TS switching points, thereby controlling the encoding information amount and the transmission information amount to arrange a no-signal period. Within the no-signal period, the TS switching is performed.

For example, a duration of time from time point t61 to time point t63 is set as a switching period for the TS switching at time point t62. The encoding information amount and the transmission information amount are controlled during the switching period to arrange a no-signal period at time point t62. At time point t62, the switch 812a of the TS switch driver 812 is turned on while the switches 813a through 815a of the respective TS switch drivers 813 through 815 are turned off. The multiplexed TS output provided by the TS packet multiplexor circuit 816 is switched from the SDTV program service to the HDTV program service as shown in FIG. 7E. A duration of time from time point t64 to time point t66 is set for the TS switching at time point t65. The encoding information amount and the transmission information amount are controlled during the switching period to arrange a no-signal period. The switch 812a of the TS switch driver 812 is turned off while the switches 813a through 815a of the respective TS switch drivers 813 through 815 are turned on. The multiplexed TS output provided by the TS packet multiplexor circuit 816 is switched from the one HDTV program service to the three SDTV program services.

During the TS switching, the PSI is formed at the beginning of the multiplexed TS output. A receiver apparatus receiving the TS quickly acquires the PSI subsequent to the TS switching. The receiver apparatus is quickly restored in the event of switching due to any trouble.

Figure 8:
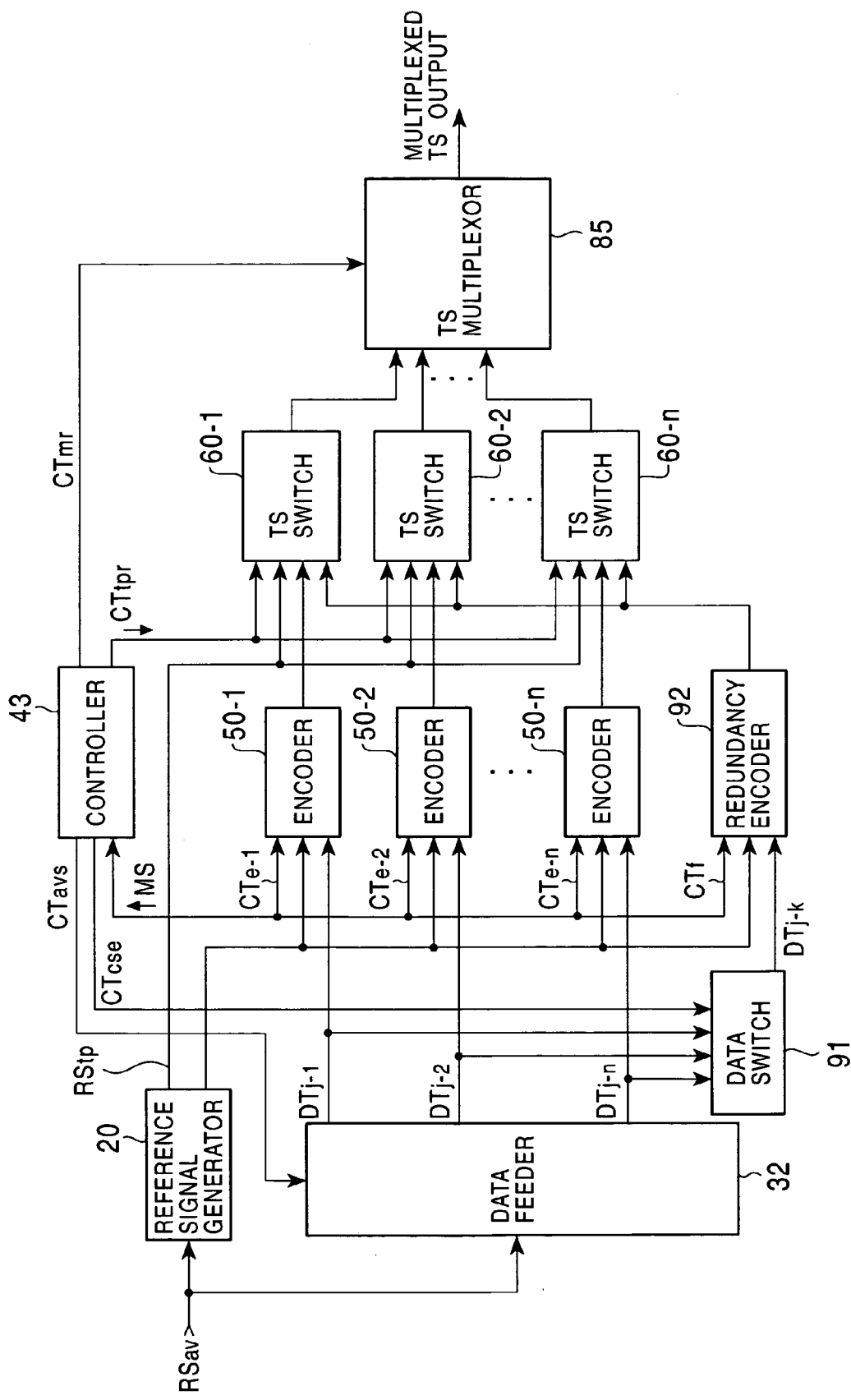
FIG. 8 is a block diagram showing a redundancy switching process.

FIG. 8 shows an arrangement for a redundancy switching process of the signal transmission apparatus for increasing redundancy. In FIG. 8, elements identical to those described with reference to FIG. 1, FIG. 4, and FIG. 6 are designated with the same reference numerals, and the detailed discussion thereof is not repeated.

A controller 43 controls an element data feeder 32, encoders 50-1 through 50-n, TS switches 60-1 through 60-n, a TS multiplexor 85, a data switch 91, a redundancy encoder 92, etc. in harmony. The controller 43 generates and supplies the above-referenced element data transmission control signal CTavs to the element data feeder 32. The controller 43 generates redundancy switch control signals CTcse and CTtpr when the controller 43 detects the generation of any trouble based on operation monitoring signals MS-1 through MS-n respectively supplied from the encoders 50-1 through 50-n to be discussed later. The redundancy switch control signal CTcse fed to the data switch 91 controls the data switching operation in the data switch 91. The redundancy switch control signal CTtpr is fed to the TS switch 60-k connected to the encoder 50-k that suffers from a trouble. The TS switch 60-k thus performs a switching operation to select the switching TS. The controller 43 generates and supplies a TS multiplexing control signal CTmr to the TS multiplexor 85, thereby controlling the operation of a multiplexing TS output.

In response to the encoding data element reference signal RSav, the element data feeder 32 generates a plurality of data signals composed of pictures and voices, and data relating the pictures and voices. The element data feeder 32 thus generates and supplies first data signal DTj-1 to the encoder 50-1 and the data switch 91. The element data feeder 32 generates and supplies second data signal DTj-2 to the encoder 50-2 and the data switch 91, . . . , and then, the element data feeder 32 generates and supplies n-th data signal DTj to the encoder 50-n and the data switch 91. The supply of the data signal DTj from the element data feeder 32 to the encoders 50-1, . . . , 50-n, and the redundancy encoder 92 is performed in response to the element data transmission control signal CTavs supplied from the controller 43.

The encoder 50-1 performs the same process as that performed by the encoder 50 as shown in FIG. 1. In response to an encoding control signal CTe-1 coming from the controller 43, the encoder 50-1 encodes the data signal DTj-1, thereby generating and feeding an encoding TS as a switching TS to the TS switch 60-1. The encoding process and generation of the TS are performed in synchronization with the picture sequence reference signal RSps and the voice encoding unit reference signal RSsb from the reference signal generator 20. The encoder 50-1 generates not only the encoding TS, but also an operation monitoring signal MS-1 indicating that a correct encoded TS has been generated.

The encoders 50-2 through 50-n perform the same process as that performed by the encoder 50-1. The encoders 50-2 through 50-n respectively generate and supply the encoding TS's to the TS switches 60-2 through 60-n, while generating and supplying the operation monitoring signals MS-2 through MS-n to the controller 43 at the same time.

Based on the redundancy switch control signal CTcse, the data switch 91 selects, from among the plurality of pieces of data signals DTj-1 through DTj-n, the data signal DTj-k which is fed to the encoder 50-k in trouble, and supplies the selected data signal DTj-k to the redundancy encoder 92. Using the data signal DTj-k supplied from the data switch 91, the redundancy encoder 92 performs an encoding process similar to the one performed by the encoder 50-1 through 50-n, generates the encoding TS and supplies it to the TS switches 60-1 through 60-n.

The TS switch 60-1 receives the encoding TS's from the encoder 50-1 and the redundancy encoder 92. The TS switch 60-1 selects the encoding TS supplied from the encoder 50-1. When the TS switch 60-1 receives the redundancy switch control signal CTtpr from the controller 43, the TS switch 60-1 selects the encoding TS supplied from the redundancy encoder 92 rather than the encoding TS supplied from the encoder 50-1. Similarly, the TS switch 60-2 through 60-n selects either the encoding TS respectively supplied from the encoders 50-2 through 50-n or the encoding TS supplied from the redundancy encoder 92 in response to the redundancy switch control signal CTtpr.

The TS switches 60-1 through 60-n receive the TS switching reference signal RStp from the reference signal generator 20, and supply the TS multiplexor 85 with the encoding TS's in synchronization with the TS switching reference signal RStp.

The TS multiplexor 85 multiplexes the encoding TS's supplied from the TS switches 60-1 through 60-n into a single stream in response to the TS multiplexing control signal CTmr supplied from the controller 43, thereby providing a multiplexed TS output.

Figure 9:
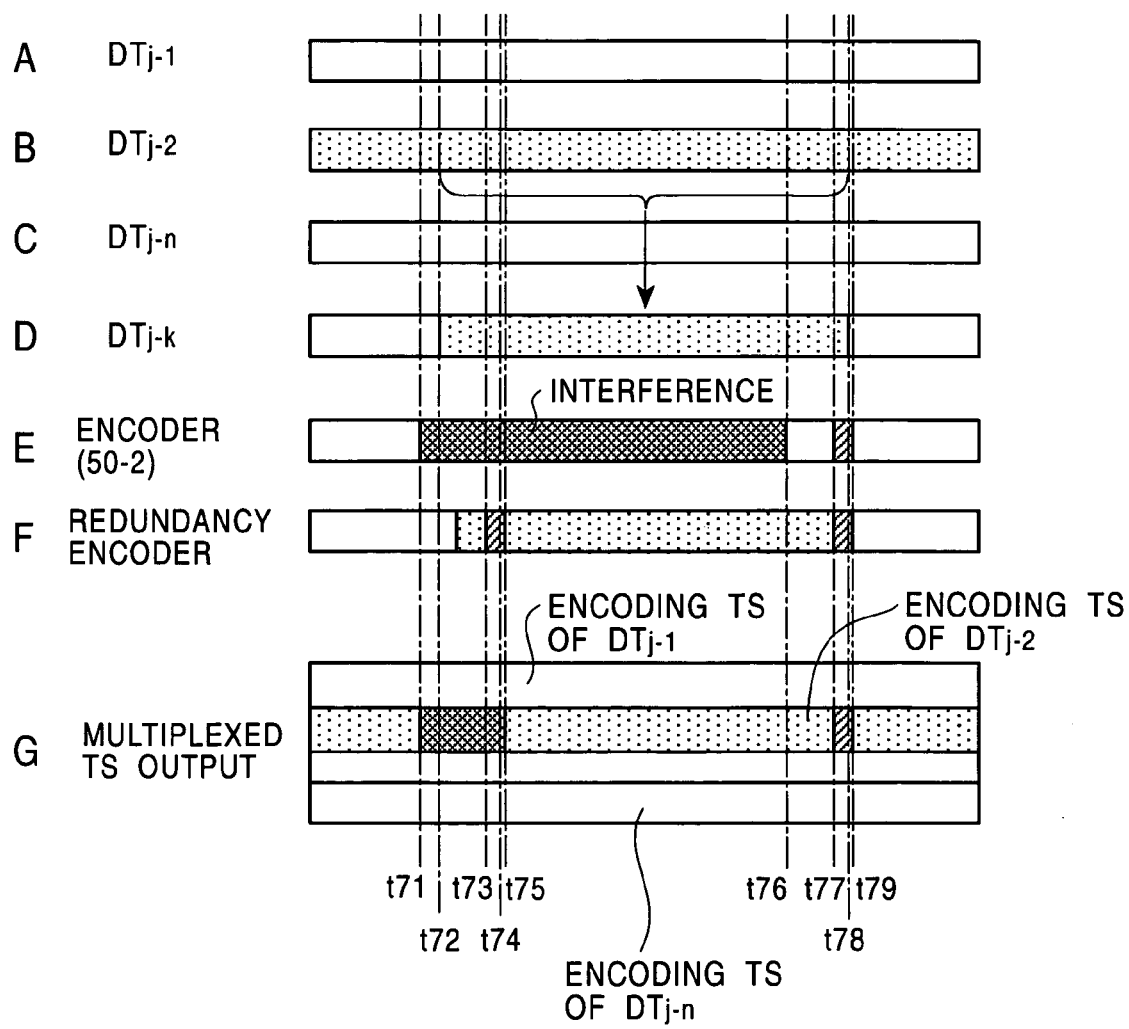
FIGS. 9A–9G illustrate the redundancy switching process.

FIGS. 9A–9G show the operation of the redundancy switching process, for example, when the encoder 50-2 is in trouble. FIG. 9A shows the data signal DTj-1 supplied to the encoder 50-1, FIG. 9B shows the data signal DTj-2 supplied to the encoder 50-2, FIG. 9C shows the data signal DTj-n supplied to the encoder 50-n.

Referring to FIG. 9E, when the controller 43 detects in the operation monitoring signal MS-2 at time point t71 that a trouble takes place in the encoder 50-2, the controller 43 controls the operation of the data switch 91 through the redundancy switch control signal CTcse, and selects the data signal DTj-2 of the encoder 50-2, which is in trouble. Referring to FIG. 9D, the data signal DTj-k fed to the redundancy encoder 92 is the data signal DTj-2 at time point t72.

The controller 43 sets, to time point t74, the TS switching point at which the encoding TS from the encoder 50-2 is replaced with the encoding TS supplied from the redundancy encoder 92 and sets a duration of time from time point t73 to time point t75 as a switching period. As shown in FIG. 9F, the redundancy encoder 92 starts the required operation for the switching period on the supplied data signal DTj-k at time point t73, thereby controlling the encoding information amount and the transmission information amount. At time point t74 in the no-signal period, the redundancy switch control signal CTtpr is supplied to the TS switch 60-2 to cause the TS switch 60-2 to select the encoding TS supplied from the redundancy encoder 92. In synchronization with the TS switching reference signal RStp at time point t75, the encoding TS supplied from the redundancy encoder 92 is fed to the TS multiplexor 85. The redundancy encoder 92 switches to the normal operation for the normal period from the operation for the switching period in response to the TS switching in the TS switch 60-2.

As shown in FIG. 9G, the multiplexed TS output from the TS multiplexor 85 lacks the output of the data signal DTj-2 from time point t71 when the trouble occurred to time point t75 when the TS switch 60-2 performed switching. Regardless of whether or not the encoder 50-2 is restored from the trouble, the encoding TS derived from the data signal DTj-2 is continuously output from time point t75.

When the controller 43 is notified at time point t76 that the encoder 50-2 is restored from the trouble, the controller 43 sets to time point t78 a TS switching point for switching to the encoding TS from the encoder 50-2 from the encoding TS from the redundancy encoder 92, setting a duration of time from time point t77 to time point t79 to a switching period.

The encoder 50-2 and the redundancy encoder 92 start the above-referenced switching period operation on the supplied data at time point t77, thereby controlling the encoding information amount and the transmission information amount. The redundancy switch control signal CTtpr is fed to the TS switch 60-2 at time point t78 within a no-signal period, thereby causing the TS switch 60-2 to select the encoding TS from the encoder 50-2 for TS switching. In synchronization with the TS switching reference signal RStp, the encoding TS from the encoder 50-2 is fed to the TS multiplexor 85 at time point t79. The encoder 50-2 switches to the normal period operation from the switching period operation in response to the TS switching at the TS switch 60-2. At time point t79 thereafter, the multiplexed TS output is provided using the encoding TS supplied from the encoder 50 which is now restored from the trouble.

Figure 10:
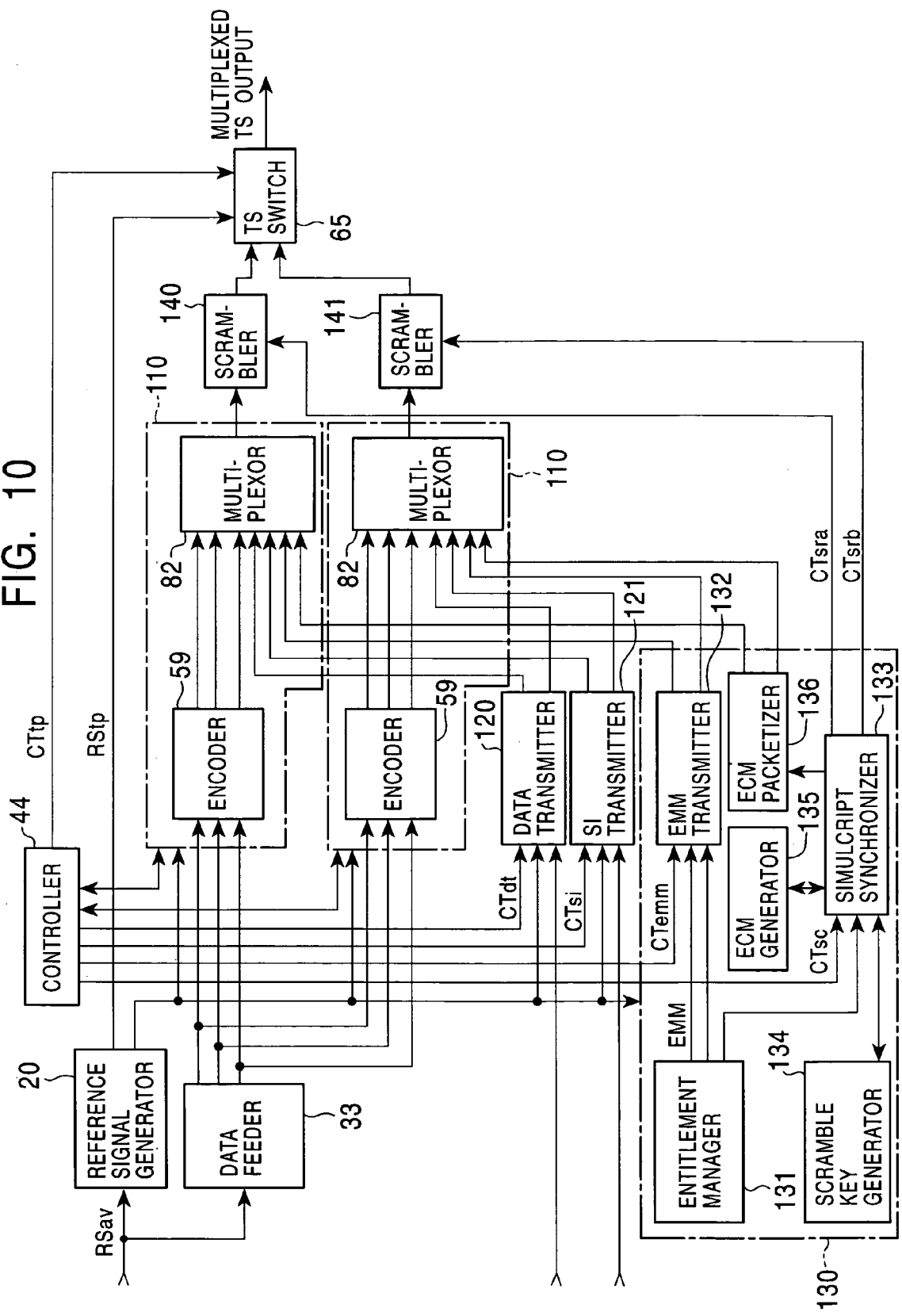
FIG. 10 shows the construction of an entire encoding and multiplexing system.

The signal transmission apparatus 10 shown in FIG. 8 shows the redundancy switching process on the assumption that a single encoder is in trouble. A redundancy switching process may be performed on the entire encoding and multiplexing system. FIG. 10 is a block diagram of an entire encoding and multiplexing system working on a redundancy switching process. In FIG. 10, elements identical to those described with reference to FIG. 1 are designated with the same reference numerals.

The controller 44 controls an element data feeder 33, a TS switch 65, encoder and multiplexor blocks 100 and 110, a data transmitter 120, an SI transmitter 121 for transmitting Service Information (SI), an entitlement receiver block 130, etc. in harmony. The controller 44 generates and supplies the above-referenced element data transmission control signal CTavs to the element data feeder 33. The controller 44 generates and supplies an encoding control signal CTco to the encoder and multiplexor blocks 100 and 110, thereby controlling the generation of encoding outputs in the encoder and multiplexor block 100. The controller 44 receives operation monitoring signals from the encoder and multiplexor blocks 100 and 110 to be discussed later. In response to the operation monitoring signal, a TS switching control signal CTtp is generated and supplied to the TS switch 65.

The controller 44 generates an operation control signal CTdt for controlling the operation of the data transmitter 120, an operation control signal CTsi for controlling the operation of the SI transmitter 121, an operation control signal CTemm for controlling the operation of an EMM transmitter 132 in the entitlement receiver block 130, and an operation control signal CTsc for controlling the operation of a simulcript synchronizer 133 in the entitlement receiver block 130, and supplies these signals to the respective blocks. The controller 44 generates and supplies ECM (Entitlement Control Message) element information to the simulcript synchronizer 133.

In synchronization with the encoding data element reference signal RSav, the element data feeder 33 generates a plurality of element data signals DT from pictures and voices and data relating to the pictures and voices, and supplies the element data signals DT to the encoder and multiplexor blocks 100 and 110. The supply of the element data signals DT from the element data feeder 33 to the encoder and multiplexor blocks 100 and 110 is performed based on the data transmission control signal CTavs supplied from the controller 44.

The encoder and multiplexor block 100 includes an encoder group 55 composed a plurality of above-referenced encoders 50 and a multiplexor 82. The encoders (not shown) forming the encoder group 55 performs an encoding process on the element data signal DT supplied from the element data feeder 33, thereby generating and feeding the encoding TS to the multiplexor 82. The multiplexor 82 receives a data encoding TS from the data transmitter 120 to be discussed later, an SI encoding TS from the SI transmitter 121, and EMM-TS and ECM-TS from the entitlement receiver block 130. The multiplexor 82 selects and multiplexes the supplied encoding TS, the data encoding TS, the SI encoding TS, the EMM-TS, and the ECM-TS into a single stream, thereby forming a multiplexed TS. The multiplexed TS generated by the multiplexor 82 is fed to a scrambler 140.

The encoder and multiplexor 110 is identical in construction to the encoder and multiplexor block 100. The multiplexed TS generated by the multiplexor 82 in the encoder and multiplexor 110 is fed to a scrambler 141.

The data transmitter 120 and the SI transmitter 121 are respectively identical in construction to the above-referenced encoder 50. The data transmitter 120 performs a signal encoding process on element data to be transmitted, thereby forming the data encoding TS. The data transmitter 120 supplies the multiplexors 82 in the encoder and multiplexor block 100 and the encoder and multiplexor 110 with the data encoding TS's. The data transmitter 120 performs signal encoding process on the operation control signal CTdt supplied from the controller 44, in synchronization with the picture sequence reference signal RSps and the voice encoding unit reference signal RSsb supplied from the reference signal generator 20.

The SI transmitter 121 performs an encoding process on the SI element to be transmitted, e.g., on an Electronic Program Guide (EPG), thereby creating an SI encoding TS. The SI transmitter 121 supplies the SI encoding TS to the multiplexors 82 in the encoder and multiplexor blocks 100 and 110. Like the data transmitter 120, the SI transmitter 121 performs the encoding process based on the operation control signal CTsi supplied from the controller 44, in synchronization with the reference signals generated in the reference signal generator 20.

The entitlement receiver block 130 performs an encryption or scrambling process so that a subscriber only views or listens to element data. An entitlement manager 131 generates Entitlement Management Message (EMM) including information as to whether a viewer is a flat rate subscriber or a pay-per-view subscriber, and information of viewable channel numbers, and supplies the EMM to the EMM transmitter 132. The entitlement manager 131 also generates and supplies entitlement reception information to the EMM transmitter 132 and the simulcript synchronizer 133.

Based on an operation control signal CTemm from the controller 44, the EMM transmitter 132 performs an encryption operation on the EMM, thereby generating the EMM-TS. In synchronization with the reference signals from the reference signal generator 20, the EMM transmitter 132 supplies the EMM-TS to the multiplexors 82 in the encoder and multiplexor blocks 100 and 110.

Based on an operation control signal CTsc and Entitlement Control Message (ECM) element information from the controller 44, and the entitlement reception information from the entitlement manager 131, the simulcript synchronizer 133 controls a scramble key generator 134 to obtain a scramble key.

An ECM generator 135 is supplied with the obtained scramble key and ECM element information including information whether the program is a flat rate program or a pay-per-view program, information for helping a subscriber recognize an expiration date of the subscription contract, information for helping the subscriber recognize time serving as a reference in the generation of viewing records, program fees, age limits, and the number of and time of previews of pay-per-view programs. The ECM generator 135 encrypts the ECM element information with the scramble key. The ECM information encrypted by the ECM generator 135 is fed to an ECM packetizer 136 to generate the ECM-TS. The ECM packetizer 136 supplies the ECM-TS to the multiplexors 82 in the encoder and multiplexor blocks 100 and 110 in synchronization with the reference signals from the reference signal generator 20.

Using the obtained scramble key, the simulcript synchronizer 133 generates and supplies a scramble control signal CTsra to the scrambler 140, while generating and supplying a scramble control signal CTsrb to a scrambler 141.

The scrambler 140 scrambles the multiplexed TS supplied from the encoder and multiplexor block 100 in response to the scramble control signal CTsra supplied from the simulcript synchronizer 133, and supplies the scrambled multiplexed Ts to the TS switch 65. Like the scrambler 140, the scrambler 141 scrambles the multiplexed TS supplied from the encoder and multiplexor 110 in response to the scramble control signal CTsrb supplied from the simulcript synchronizer 133, and supplies the scrambled multiplexed TS to the TS switch 65.

The TS switch 65 performs TS switching on the scrambled multiplexed TS's supplied from the scramblers 140 and 141 at the point indicated by the TS switching reference signal RStp supplied from the reference signal generator 20, thereby outputting a single multiplexed TS.

The multiplexed TS from the encoder and multiplexor block 100 is now scrambled, and is then output from the TS switch 65. When an operation monitoring signal from the encoder and multiplexor block 100 indicates that the encoder group 55 is in trouble, a switching period is set up for TS switching in each of the encoder and multiplexor blocks 100 and 110 to arrange a no-signal period. During the switching period, the data transmitter 120, the SI transmitter 121, the EMM transmitter 132, and the ECM packetizer 136 are inhibited from outputting the effective TS thereof. When the switching period operation is performed to arrange a no-signal period, the TS switch 65 performs the TS switching process to select the scrambled multiplexed TS from the encoder and multiplexor 110 which is free from any trouble, rather than the multiplexed TS supplied from the scrambler 140.

When the scrambler 140 is in trouble, a switching period is set up and the operation of the encoder and multiplexor blocks 100 and 110 is controlled. The no-signal period is set up, and the TS switch 65 performs the TS switching operation to select the multiplexed TS from the scrambler 141 free from any trouble during the no-signal period, rather than selecting the multiplexed Ts supplied from the scrambler 140.

Even if any trouble takes place in each of the encoder and multiplexor blocks 100 and 110, and the scrambles 140 and 141, the system is quickly restored from the trouble by performing the TS switching.

Figure 11:
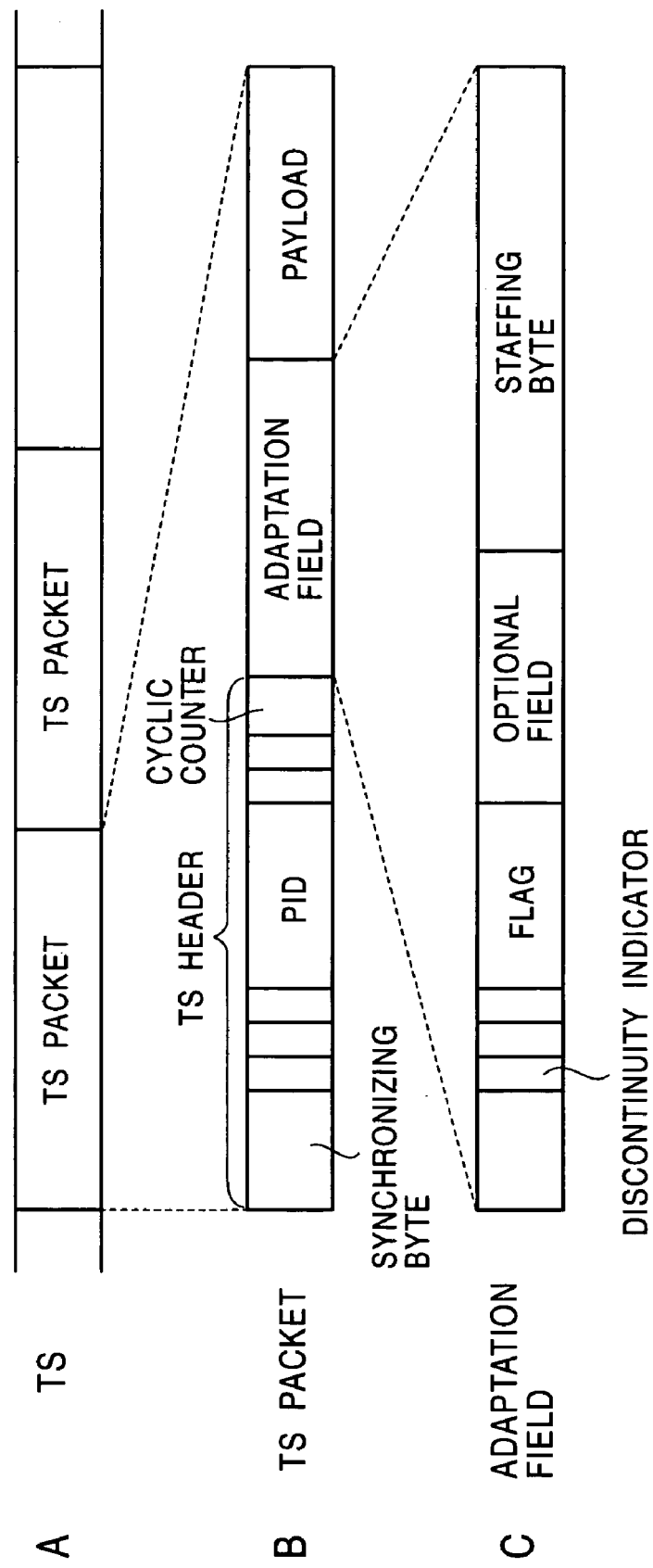
FIGS. 11A–11C shows a data structure of a TS.
Figure 12:
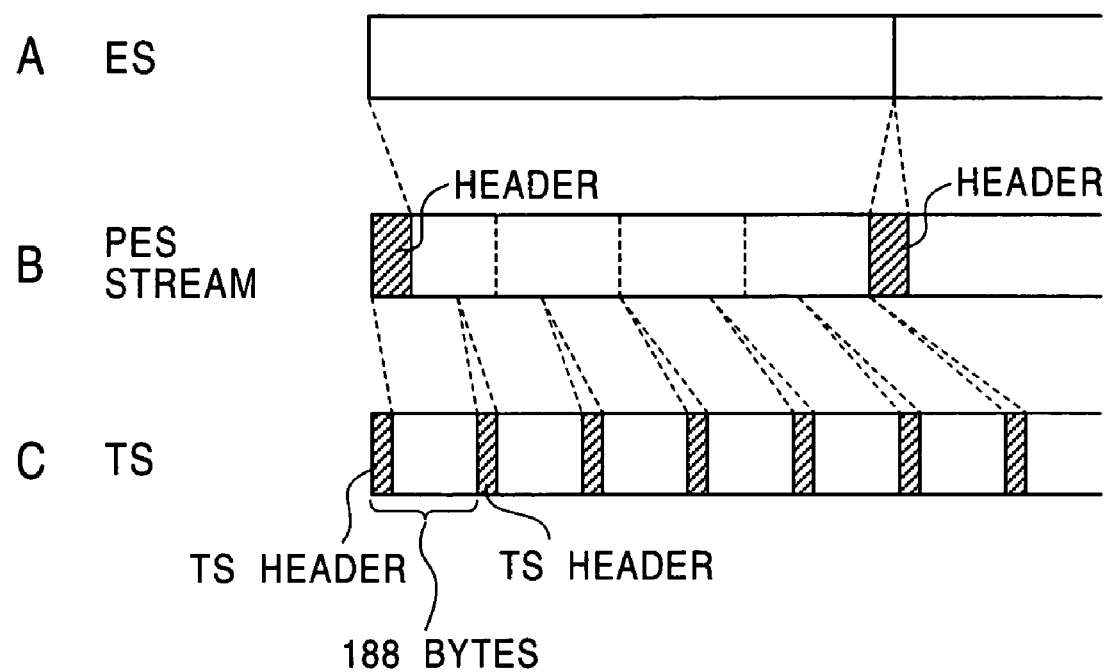
FIGS. 12A–12C shows the generation of the TS.

Referring to FIG. 11A, a TS is composed of a plurality of TS packets. Referring to FIG. 11B, the header of a TS packet includes a PID (Packet Identification) for packet identification, and a cyclic counter as a continuity indicator for indicating whether any packet having the same PID is discarded in the middle. When the TS switching is performed, the multiplexed TS output resulting from the TS switching can be discontinuous in the cyclic counter. For this reason, the multiplexed TS output from the TS switch 60 or 65 and the multiplexor 80 or 81 is fed to an information correction unit (not shown), which then performs correction so that the count at the cyclic counter subsequent to the TS switching is continuous from the count at the cyclic counter prior to the TS switching. Even if the TS switching is performed when the encoder is trouble or the encoder is restored from a trouble, the continuity of the cyclic counter is maintained, and the decoding process of the multiplexed TS output is properly performed.

When an adaptation field is included in the TS packet, a discontinuity indicator included in the adaptation field shown in FIG. 11C indicates that the same PID packet has a new content with a system clock reset. When a new element encoding TS with TS switching performed is transmitted, the information correction unit set the discontinuity indicator while correcting the count of the cyclic counter to a continuous value. The multiplexed TS output subsequent to the TS switching is thus properly decoded.

In the multiplexed TS output concatenated in the above-referenced method, the picture TS switching is performed on a per GOP basis or the voice TS switching on a per PES packet basis in response to the reference signals generated by the reference signal generator 20. Since the packet of the PSI or PCR section is placed at the beginning of the GOP or PES packet, the packet is completed prior to the TS switching point. In this way, the cyclic counter in the same PES packet or section is continuous.

When the receiver apparatus receiving the multiplexed TS output disregards the discontinuity of the cyclic counter straddling a plurality of PES packets or sections, signal processing is possible even if the count of the counter is not corrected by the information correction unit. Since the no-signal period is assembled prior to and subsequent to the TS switching point so that no TS packet having effective information is sent, no time-out process is performed in the no-signal period in the receiver apparatus.

In accordance with the present invention, streams are selected from a plurality of streams, each formed of a packet signal, and are concatenated into a single output stream. Among the plurality of stream output units respectively outputting the streams, the STCs are synchronized. The continuity of the PCRS, the PTS's, and the DTS's in the output stream are assured. The stream output unit is controlled so that no stream having information is transmitted at the stream switching. Since the output stream is formed without lack of information and without adding information, the streams are thus concatenated without introducing transients and characteristic degradations.

The Program Specific Information (PSI) and the Program Clock Reference (PCR) coincide with each other in position and period so that the transmission periods of the PSI and the PCR in the output stream are set to be a predetermined period. The continuity of the picture sequence, the Presentation Time Stamp (PTS) and the Decoding Time Stamp (DTS) in the output stream is assured in the output stream by synchronizing the Groups of Pictures (GOPS) prior to and subsequent to the stream switching. The start end of a first Group of Pictures (GOP) subsequent to the stream switching becomes the start end of a Packetized Elementary Stream (PES) tagged with a Presentation Time Stamp (PTS). The apparatus is quickly restored from trouble by the TS switching.

Since the output stream is formed of streams that are created by encoding, packetizing, and multiplexing signals of picture element data and voice element data on a real time basis, streams that are created by reproducing pre-recorded streams, and streams that are created by adjusting the timing of streams supplied from outside, the streams are concatenated in normal working process for program scheduling without introducing transients and characteristic degradation.

Since a stream for displaying a picture at a standard definition and a stream for displaying a picture at a high definition are concatenated to each other, mixing and multiplexing program scheduling is performed without introducing transients and characteristic degradations.

The stream from the redundancy stream output unit is also concatenated. In the event of trouble, the apparatus is switched to the stream from the redundancy stream output, thereby avoiding the trouble.

What is claimed is:

1. A signal transmission method for selecting streams from a plurality of streams, each composed of a signal packetized in compliance with the Moving Picture Experts Group (MPEG) Standard, and concatenating the streams into one single output stream and outputting the output stream, said signal transmission method comprising the steps of:

assuring synchronization in System Time Clocks (STC's) across a plurality in stream output means for outputting streams;

assuring the continuity of Program Clock Reference (PCR), Presentation Time Stamp (PTS), and Decoding Time Stamp (DTS) of the output stream when the streams are concatenated, wherein the PCR information, PTS information and DTS information are extracted from the output stream; and controlling said stream output means, as a function of the PCR information, PTS information and DTS information extracted from the output stream, so that any stream containing information is not transmitted at the switching of streams when the streams are concatenated, setting a duration of time as a switching period where a redundancy encoder controls an encoding information amount and a transmission information amount.

2. A signal transmission method according to claim 1, wherein said stream output means causes the Program Specific Information (PSI) and the Program Clock Reference (PCR) to coincide with each other in timing and period and the transmission periods of the PSI and the PCR in the output stream are set to be a predetermined period.

3. A signal transmission method according to claim 2, wherein said stream is created by packetizing a picture element signal, and wherein any stream containing information is not transmitted at the switching of streams by controlling the stream output means so that the finish end of the Group of Pictures (GOP) is transmitted prior to the switching of the streams while the start end of a next GOP is transmitted subsequent to the switching of the streams.

4. A signal transmission method according to claim 3, wherein the continuity of the picture sequence, the Presentation Time Stamp (PTS) and the Decoding Time Stamp (DTS) in the output stream is assured in the output stream by synchronizing the Groups of Pictures (GOPS) prior to and subsequent to the stream switching across the stream output means.

5. A signal transmission method according to claim 3, wherein the stream output means is controlled so that a first Group of Pictures (GOP) subsequent to the stream switching becomes a closed GOP.

6. A signal transmission method according to claim 3, wherein the stream output means is controlled so that the start end of a first Group of Pictures (GOP) subsequent to the stream switching becomes the start end of a Packetized Elementary Stream (PES) tagged with a Presentation Time Stamp (PTS).

7. A signal transmission method according to claim 2, wherein said stream is created by packetizing a voice element signal, and wherein any stream containing information is not transmitted at the switching of streams by controlling the stream output means so that the transmission of the finish end of a voice encoding unit is completed prior to the stream switching while the start end of a next voice encoding unit is transmitted subsequent to the stream switching.

8. A signal transmission method according to claim 7, wherein the continuity of the Presentation Time Stamp (PTS) in the output stream is assured by synchronizing the voice encoding units prior to and subsequent to the stream switching across the stream output means.

9. A signal transmission method according to claim 7, wherein the stream output means is controlled so that the start end of a first voice encoding unit subsequent to the stream switching becomes the start end of a Packetized Elementary Stream (PES) tagged with a Presentation Time Stamp (PTS).

10. A signal transmission method according to claim 2, wherein said stream is created by packetizing an encoding signal relating to one of a picture element signal and a voice element signal, and
   wherein any stream containing information is not transmitted at the switching of streams by controlling the stream output means so that the transmission of the finish end of the encoding unit of the encoding signal is completed prior to the stream switching while the start end of a next encoding unit is transmitted subsequent to the stream switching.

11. A signal transmission method according to claim 10, wherein the data encoding units are synchronized across the stream output means prior to and subsequent to the stream switching, thereby assuring the continuity of the Presentation Time Stamps in the output stream.

12. A signal transmission method according to claim 10, wherein the stream output means is controlled so that the start end of a first data encoding unit subsequent to the stream switching becomes the start end of a Packetized Elementary Stream (PES) packet tagged with a Presentation Time Stamp (PTS).

13. A signal transmission method according to claim 1, wherein said stream is created by packetizing information signal relating to service information.

14. A signal transmission method according to claim 1, wherein said stream is created by packetizing information signal relating to individual information about receiving means for receiving said output stream.

15. A signal transmission method according to claim 1, wherein said stream is created by packetizing a scrambled signal, and
   wherein control information containing a scramble key is synchronized across said stream output means for streaming, and the continuity of the scramble key is assured subsequent to the stream switching.

16. A signal transmission method according to claim 1, wherein said stream output means is controlled so that the scramble key coincides with the scramble key of common information prior to and subsequent to the stream switching and so that the Program Specific Information (PSI) coincides with the Progress Clock Reference (PCR) in timing and period, and
   wherein the transmission period of common information in the output stream is set to be a predetermined period.

17. A signal transmission method according to claim 1, wherein said stream is created by packetizing a signal having a Transmission and Multiplexing Configuration Control (TMCC) frame structure, and
   wherein the TMCC frames are synchronized across the stream output means and the stream output means is controlled so that the transmission of the finish end of the TMCC frame is completed prior to the stream switching while the start end of a next TMCC frame is transmitted subsequent to the stream switching.

18. A signal transmission method according to claim 1, wherein when a discontinuity occurs in a continuity indicator in the output stream subsequent to the steam switching, the value of the continuity indicator subsequent to a discontinuity point is updated to be a value continued from the value immediately prior to the discontinuity point.

19. A signal transmission apparatus comprising:
   a plurality of stream output means which encodes and packetizes a signal in compliance the Moving Picture Experts Group (MPEG) Standard, multiplexes packetized signals, and then outputs the multiplexed signal in a stream,
   wherein Program Clock Reference (PCR) information, Presentation Time Stamp (PTS) information, and Decoding Time Stamp (DTS) information are extracted from the output stream;
   a stream switching means which creates a single output stream by switching and concatenating streams output from said plurality of stream output means, thereby forming and outputting a single output stream;
   a control means for controlling the operation of said plurality of stream output means and said stream switching means; and
   a reference signal generator means for generating a reference signal serving as a reference for the operation performed by said plurality of stream output means and said stream switching means,
   wherein said control means controls said plurality of stream output means, thereby synchronizing the System Time Clocks (STC) across said stream output means, assures the continuity of the (PCR) information, the (PTS) information, and the (DTS) information, which were extracted from the output stream, while not transmitting any stream having information when the streams are concatenated,
   a setting means for setting a duration of time as a switching period where a redundancy encoder controls an encoding information amount and a transmission information amount.

20. A signal transmission apparatus according to claim 19, comprising as said plurality of stream output means:
   a stream output means which outputs a stream by encoding, packetizing, and multiplexing signals of picture element data or voice element data on a real time basis;
   a stream output means which outputs a stream by reproducing a prerecorded stream; and
   a stream output means which outputs a stream by adjusting the timing of streams supplied from outside.

21. A signal transmission apparatus according to claim 19, comprising as said plurality of stream output means:
   a stream output means which outputs a stream for displaying picture element data in a standard format; and
   a stream output means which outputs a stream for displaying picture element data at a definition higher than that of said standard format.

22. A signal transmission apparatus according to claim 19, comprising:
   a selector means which receives said signals from which the stream is formed by said plurality of stream output means, and selects, from among said signals, the signal used by one of said plurality of stream output means; and
   a redundancy stream output means which outputs a stream using the signal selected by said selector means,
   wherein said stream output means supplies said control means with an operation monitoring signal indicating whether the generation of the stream is correctly in progress, and
   wherein when said control means detects through the operation monitoring signal any stream output means which fails to create correctly the stream, said control means controls said selector means to supply said redundancy stream output means with the signal which was supplied to the stream output means that failed to create correctly the stream, and said control means controls said stream switching means to use the stream output from the redundancy stream output means rather said stream output means which failed to create correctly the stream.

23. A signal transmission apparatus according to claim 19, wherein said stream output means creates a stream which includes common information and individual information relating to Program Specific Information (PSI), service information, and entitlement reception information.

24. A signal transmission apparatus according to claim 19, wherein said stream output means creates a steam which includes a signal having a Transmission and Multiplexing Configuration Control (TMCC) structure.

25. A transport stream generation system for generating a single output transport stream by switching a plurality of transport streams, comprising:
- an extractor means for extracting Program Clock Reference (PCR) information, Presentation Time Stamp (PTS) information, and Decoding Time Stamp (DTS) information contained in the plurality of transport streams;
- a switching means for generating the single output transport stream by switching the plurality of transport streams; and
- a control means for controlling said switching means referencing the PCR information, the PTS information, and the DTS information extracted by said extractor means,
- wherein said control means controls said switching means to assure continuity of the PCR information, the PTS information, and the DTS information contained in the output transport streams,
- a setting means for setting a duration of time as a switching period where a redundancy encoder controls an encoding information amount and a transmission information amount.

26. A transport stream generation system for generating a single output transport stream by switching a plurality of transport streams, comprising:
- an extractor means for extracting Program Clock Reference (PCR) information, Presentation Time Stamp (PTS) information, and Decoding Time Stamp (DTS) information contained in the plurality of transport streams;
- a switching means for generating the single output transport stream by switching the plurality of transport streams on a per transport stream packet basis; and
- a control means for controlling said switching means referencing the PCR information, the PTS information, and the DTS information extracted by said extractor means,
- wherein there is arranged, within a predetermined period of time in the vicinity of a switching point of said switching means, a time gap during which a transport packet containing information relating to the plurality of transport streams is not output from said switching means, and said control means controls said switching means to switch the plurality of transport streams within the time gap where a redundancy encoder controls an encoding information amount and a transmission information amount.

27. A transport stream generation system for generating a single output transport stream by switching a plurality of transport streams, comprising:
- an extractor means for extracting time information contained in the plurality of transport streams;
- a switching means for generating the single output transport stream by switching the plurality of transport streams on a per transport stream packet basis; and
- a control means for controlling said switching means referencing the time information extracted by said extractor means,
- wherein there is arranged, within a predetermined period of time in the vicinity of a switching point of said switching means, a time gap during which a transport packet containing information relating to the plurality of transport streams is not output from said switching means, and said control means controls said switching means to switch the plurality of transport streams within the time gap where a redundancy encoder controls an encoding information amount and a formation amount.

28. A transport stream generation method for generating a single output transport stream by switching a plurality of transport streams, comprising:
- a step of extracting time information contained in the plurality of transport streams;
- a step of generating the output transport stream by performing a switching process in which the plurality of transport streams is switched at a switching point on a per transport stream packet basis referencing the time information; and
- a step of controlling said switching process to switch the plurality of transport streams during a gap time where a redundancy encoder controls an encoding information amount and a transmission information amount, wherein there is arranged, within a predetermined period of time in the vicinity of the switching point, the time gap during which a transport packet containing information relating to the plurality of transport streams is not output as the output transport stream.

* * * * *